(12) United States Patent
Li et al.

(10) Patent No.: US 9,980,260 B2
(45) Date of Patent: May 22, 2018

(54) DATA TRANSMISSION METHOD AND APPARATUS, AND USER EQUIPMENT

(71) Applicant: Huawei Technologies Co., Ltd., Shenzhen (CN)

(72) Inventors: Qi Li, Xi'an (CN); Jiapeng Xin, Xi'an (CN); Xiaojie Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 324 days.

(21) Appl. No.: 14/958,733

(22) Filed: Dec. 3, 2015

(65) Prior Publication Data

US 2016/0088613 A1 Mar. 24, 2016

Related U.S. Application Data

(63) Continuation of application No. PCT/CN2013/076725, filed on Jun. 4, 2013.

(51) Int. Cl.
*H04W 72/04* (2009.01)
*H04W 24/10* (2009.01)
(Continued)

(52) U.S. Cl.
CPC ...... *H04W 72/0413* (2013.01); *H04B 7/0456* (2013.01); *H04B 7/063* (2013.01); *H04B 7/0617* (2013.01); *H04B 7/0619* (2013.01); *H04B 7/0632* (2013.01); *H04B 7/0639* (2013.01); *H04B 7/0857* (2013.01); *H04J 11/0053* (2013.01); *H04L 1/0015* (2013.01); *H04L 1/0019* (2013.01); *H04L 1/0026* (2013.01); *H04L 1/0027* (2013.01); *H04L 1/0035* (2013.01); *H04L 1/0077* (2013.01); *H04L 1/20* (2013.01); *H04L 5/006* (2013.01); (Continued)

(58) Field of Classification Search
CPC ............................ H04W 72/0413; H04B 7/00
See application file for complete search history.

(56) References Cited

U.S. PATENT DOCUMENTS 9,048,893 B1 * 6/2015 Sun ...................... H04L 1/0054
9,078,142 B1 * 7/2015 Zhan ..................... H04W 16/28
(Continued)

FOREIGN PATENT DOCUMENTS

CN 101626353 A 1/2010
CN 102036393 A 4/2011
(Continued)

*Primary Examiner* — Zhiren Qin
(74) *Attorney, Agent, or Firm* — Leydig, Voit & Mayer, Ltd.

(57) ABSTRACT

Embodiments of the present invention provide a data transmission method and apparatus, and UE. The method includes: receiving a downlink CQI fed back by first UE, and determining a first downlink MCS of the first UE according to the downlink CQI fed back by the first UE; allocating a transmission resource of a first cell to the first UE according to the first downlink MCS of the first UE; acquiring an uplink channel matrix of a sub-bandwidth SB level of each cell in a measurement set of the first UE; determining an SINR of a downlink transmission stream to be sent by each cell in a transmission set of the first UE; and determining a second downlink MCS of the first UE according to the SINR of the downlink transmission stream to be sent.

17 Claims, 6 Drawing Sheets

(51) Int. Cl.

| | | |
|---|---|---|
| *H04L 5/00* | (2006.01) | |
| *H04B 7/06* | (2006.01) | |
| *H04B 7/08* | (2006.01) | |
| *H04L 25/00* | (2006.01) | |
| *H04J 11/00* | (2006.01) | |
| *H04L 1/00* | (2006.01) | |
| *H04L 1/20* | (2006.01) | |
| *H04B 7/0456* | (2017.01) | |
| *H04L 27/26* | (2006.01) | |

(52) U.S. Cl.
CPC .......... *H04L 25/00* (2013.01); *H04L 27/2601* (2013.01); *H04W 24/10* (2013.01); *H04W 72/042* (2013.01); *H04L 5/00* (2013.01); *H04L 5/0046* (2013.01)

(56) References Cited

U.S. PATENT DOCUMENTS

| | | | | |
|---|---|---|---|---|
| 9,148,818 | B2* | 9/2015 | Yue | H04L 5/001 |
| 2004/0166887 | A1* | 8/2004 | Laroia | H04B 7/0491 |
| | | | | 455/522 |
| 2005/0157807 | A1* | 7/2005 | Shim | H04B 7/0413 |
| | | | | 375/267 |
| 2008/0219373 | A1* | 9/2008 | Zhang | H04B 7/0417 |
| | | | | 375/262 |
| 2009/0052357 | A1* | 2/2009 | Suo | H04L 5/006 |
| | | | | 370/280 |
| 2009/0286562 | A1* | 11/2009 | Gorokhov | H04B 7/0617 |
| | | | | 455/501 |
| 2010/0008440 | A1 | 1/2010 | Lin et al. | |
| 2010/0271963 | A1* | 10/2010 | Koorapaty | H04L 1/0003 |
| | | | | 370/252 |
| 2011/0243017 | A1* | 10/2011 | Prasad | H04W 72/085 |
| | | | | 370/252 |
| 2011/0243208 | A1 | 10/2011 | Shany et al. | |
| 2012/0113979 | A1 | 5/2012 | Cai et al. | |
| 2012/0147774 | A1 | 6/2012 | Park et al. | |
| 2012/0320775 | A1* | 12/2012 | Lee | H04B 7/024 |
| | | | | 370/252 |
| 2013/0272439 | A1* | 10/2013 | Zhang | H04B 7/0456 |
| | | | | 375/267 |
| 2014/0003260 | A1* | 1/2014 | Tabet | H04W 76/028 |
| | | | | 370/252 |
| 2014/0056272 | A1* | 2/2014 | Gao | H04J 11/0053 |
| | | | | 370/329 |
| 2015/0207608 | A1* | 7/2015 | Suikkanen | H04L 1/0003 |
| | | | | 370/329 |

FOREIGN PATENT DOCUMENTS

| | | |
|---|---|---|
| CN | 102149130 A | 8/2011 |
| CN | 102468947 A | 5/2012 |
| EP | 2701425 A1 | 2/2014 |
| JP | 2009516438 A | 4/2009 |
| JP | 2013502811 A | 1/2013 |
| JP | 2016515344 A | 5/2016 |
| WO | WO 2012075387 A1 | 6/2012 |
| WO | WO 2012142913 A1 | 10/2012 |

* cited by examiner

US 9,980,260 B2

DATA TRANSMISSION METHOD AND APPARATUS, AND USER EQUIPMENT

CROSS-REFERENCE TO RELATED APPLICATIONS

This application is a continuation of International Patent Application No. PCT/CN2013/076725, filed on Jun. 4, 2013, which is hereby incorporated by reference in its entirety.

TECHNICAL FIELD

The present invention relates to the field of communications, and in particular, to a data transmission method and apparatus, and user equipment.

BACKGROUND

Long Term Evolution (Long Term Evolution, LTE for short) is a standard of the 3rd Generation Partnership Project (3rd Generation Partnership Project, 3GPP for short), and is considered as a mainstream technology for evolution from a third generation mobile telecommunications technology (3rd-generation, 3G for short) to a fourth generation mobile telecommunications technology (4th-generation, 4G for short). The LTE includes frequency division duplex (Frequency Division Duplexing, FDD for short) and time division duplex (Time Division Duplexing, TDD for short). In an LTE-TDD system, a same frequency band is used on an uplink and a downlink, and the uplink is distinguished from the downlink merely depending on time.

In the LTE-TDD system, an existing data transmission method includes: determining, by an evolved NodeB (evolved Node B, eNB for short), a downlink modulation and coding scheme (Modulation and Coding Scheme, MCS for short) of user equipment (User Equipment, UE for short) according to a downlink channel quality indicator (Channel Quality Indicator, CQI for short) fed back by the UE; and allocating a transmission resource according to the downlink MCS of the UE. The UE generally assumes that a downlink transmission mode is a transmit diversity mode or a closed-loop spatial multiplexing mode, and determines a downlink CQI according to the assumed downlink transmission mode.

During implementation of the present invention, it is found that the prior art has at least the following problem:

When the eNB transmits downlink data by using a beamforming (Beamforming, BF for short) mode, the downlink transmission mode assumed by the UE is the transmit diversity mode or the closed-loop spatial multiplexing mode, and this is different from a transmission mode actually used by the eNB. Because the CQI is determined according to the downlink transmission mode assumed by the UE, the CQI determined by the UE may be inaccurate; consequently, the downlink MCS determined by the eNB according to the CQI fed back by the UE is inaccurate. In addition, the CQI obtained by the eNB is a quantized value (obtained by the UE through calculation), and a quantization error exists, which may lead to inaccuracy of the downlink MCS determined by the eNB. The inaccurate downlink MCS affects transmission efficiency, and causes some losses of system performance.

SUMMARY

To resolve a problem that a downlink MCS determined by an eNB is inaccurate and further affects transmission efficiency in the prior art, embodiments of the present invention provide a data transmission method and apparatus, and user equipment. The technical solutions are as follows:

According to a first aspect, an embodiment of the present invention provides a data transmission method, where the method includes:

receiving a downlink channel quality indicator fed back by first user equipment, and determining a first downlink modulation and coding scheme of the first user equipment according to the downlink channel quality indicator fed back by the first user equipment;

allocating a transmission resource of a first cell to the first user equipment according to the first downlink modulation and coding scheme of the first user equipment, where the first cell is a serving cell of the first user equipment;

acquiring an uplink channel matrix of a sub-bandwidth level of each cell in a measurement set of the first user equipment, where the uplink channel matrix of the sub-bandwidth level of each cell in the measurement set of the first user equipment is determined according to a sounding reference signal sent by the first user equipment to a first base station, and the first base station is a base station to which each cell in the measurement set of the first user equipment belongs;

determining, according to the uplink channel matrix of the sub-bandwidth level of each cell in the measurement set of the first user equipment, a signal to interference plus noise ratio of a downlink transmission stream to be sent by each cell in a transmission set of the first user equipment, where the transmission set of the first user equipment is a subset of the measurement set of the first user equipment; and determining a second downlink modulation and coding scheme of the first user equipment according to the signal to interference plus noise ratio of the downlink transmission stream to be sent.

According to a second aspect, an embodiment of the present invention provides a data transmission method, where the method includes:

sending, by user equipment, a downlink channel quality indicator to a base station to which the first cell belongs, where the first cell is a serving cell of the user equipment;

sending a sounding reference signal to a first base station, where the first base station is a base station to which each cell in a measurement set of the user equipment belongs; and receiving transmission resource allocation information and a second downlink modulation and coding scheme that are sent by the base station, where the transmission resource allocation information is used to indicate a transmission resource of the first cell that is allocated by the base station to the user equipment, where the transmission resource is allocated, after the base station determines a first downlink modulation and coding scheme according to the downlink channel quality indicator sent by the user equipment, to the user equipment according to the first downlink modulation and coding scheme, and the second downlink modulation and coding scheme is determined by the base station in the following manner: acquiring an uplink channel matrix of a sub-bandwidth level of each cell in the measurement set of the user equipment; determining, according to the uplink channel matrix of the sub-bandwidth level of each cell in the measurement set of the user equipment, a signal to interference plus noise ratio of a downlink transmission stream to be sent by each cell in a transmission set of the user equipment; and determining the second downlink modulation and coding scheme of the user equipment according to the signal to interference plus noise ratio of the downlink transmission stream to be sent; where the uplink channel matrix of the sub-bandwidth level of each cell in the measurement set of the user equipment is determined according to the sounding reference signal sent by the user equipment to the first base station, and the transmission set of the user equipment is a subset of the measurement set of the user equipment.

According to a third aspect, an embodiment of the present invention provides a data transmission apparatus, where the apparatus includes:

a first modulation and coding scheme determining module, configured to receive a downlink channel quality indicator fed back by first user equipment, and determine a first downlink modulation and coding scheme of the first user equipment according to the downlink channel quality indicator fed back by the first user equipment;

a resource allocation module, configured to allocate a transmission resource of the first cell to the first user equipment according to the first downlink modulation and coding scheme of the first user equipment that is determined by the first modulation and coding scheme determining module, where the first cell is a serving cell of the first user equipment;

a channel matrix acquiring module, configured to acquire an uplink channel matrix of a sub-bandwidth level of each cell in a measurement set of the first user equipment, where the uplink channel matrix of the sub-bandwidth level of each cell in the measurement set of the first user equipment is determined according to a sounding reference signal sent by the first user equipment to a first base station, and the first base station is a base station to which each cell in the measurement set of the first user equipment belongs;

a signal to interference plus noise ratio determining module, configured to determine, according to the uplink channel matrix that is of the sub-bandwidth level of each cell in the measurement set of the first user equipment and that is acquired by the channel matrix acquiring module, a signal to interference plus noise ratio of a downlink transmission stream to be sent by each cell in a transmission set of the first user equipment, where the transmission set of the first user equipment is a subset of the measurement set of the first user equipment; and a second modulation and coding scheme determining module, configured to determine a second downlink modulation and coding scheme of the first user equipment according to the signal to interference plus noise ratio that is of the downlink transmission stream to be sent and that is determined by the signal to interference plus noise ratio determining module.

According to a fourth aspect, an embodiment of the present invention provides user equipment, where the user equipment includes:

a channel quality indicator sending module, configured to send a downlink channel quality indicator to a base station to which the first cell belongs, where the first cell is a serving cell of the user equipment;

a sounding reference signal sending module, configured to send a sounding reference signal to a first base station, where the first base station is a base station to which each cell in a measurement set of the user equipment belongs; and a receiving module, configured to receive transmission resource allocation information and a second downlink modulation and coding scheme that are sent by the base station, where the transmission resource allocation information is used to indicate a transmission resource of the first cell that is allocated by the base station to the user equipment, where the transmission resource is allocated, after the base station determines a first downlink modulation and coding scheme according to the downlink channel quality indicator sent by the user equipment, to the user equipment according to the first downlink modulation and coding scheme, and the second downlink modulation and coding scheme is determined by the base station in the following manner: acquiring an uplink channel matrix of a sub-bandwidth level of each cell in the measurement set of the user equipment; determining, according to the uplink channel matrix of the sub-bandwidth level of each cell in the measurement set of the user equipment, a signal to interference plus noise ratio of a downlink transmission stream to be sent by each cell in a transmission set of the user equipment; and determining the second downlink modulation and coding scheme of the user equipment according to the signal to interference plus noise ratio of the downlink transmission stream to be sent; where the uplink channel matrix of the sub-bandwidth level of each cell in the measurement set of the user equipment is determined according to the sounding reference signal sent by the user equipment to the first base station, and the transmission set of the user equipment is a subset of the measurement set of the user equipment.

The technical solutions provided in the embodiments of the present invention have the following beneficial effects:

An uplink channel matrix of an SB level of each cell in a measurement set of first UE is acquired; and an SINR of a downlink transmission stream to be sent by each cell in a transmission set of the first UE is determined according to the uplink channel matrix of the SB level of each cell in the measurement set of the first UE; and then a second downlink MCS of the first UE is determined according to the SINR of the downlink transmission stream to be sent. That is, in the embodiments of the present invention, a downlink channel is estimated by using an uplink channel. In this manner, in a system (for example, an LTE-TDD system) in which an uplink channel and a downlink channel are approximate, a second downlink MCS that is more accurate than a first downlink MCS may be obtained. As a result, downlink channel quality can be fully used, and transmission efficiency is improved. In addition, in the embodiments of the present invention, the SINR of the downlink transmission stream to be sent by each cell in the transmission set of the first UE is determined according to the uplink channel matrix of the SB level of each cell in the measurement set of the first UE, and the second downlink MCS of the first UE is determined according to the SINR of the downlink transmission stream to be sent, which avoids a problem that a downlink MCS determined by using a quantized value (CQI) is inaccurate in the prior art.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

To make the embodiments of the present invention comprehensible, the following first briefly introduces a measurement set and a transmission set. In the embodiments, a measurement set and a transmission set are defined for UE. Measurement sets and transmission sets of different UEs may be different. A cell in the measurement set of the UE receives and processes uplink data sent by the UE, and information is exchanged between cells in the measurement set of the UE. The uplink data sent by the UE includes a downlink CQI and a sounding reference signal (Sounding Reference Signal, SRS for short). The downlink CQI is in a one-to-one correspondence with a downlink transmission stream assumed by the UE. Cells in the transmission set of the UE are used to jointly transmit downlink data to the UE. Joint transmission includes coherent transmission and incoherent transmission. In coherent transmission, the cells in the transmission set of the UE determine a transmit weight of each cell by exchanging channel information. In incoherent transmission, the cells in the transmission set of the UE independently determine their respective transmit weights. The transmission set of the UE is a subset of the measurement set of the UE.

Specifically, for determining transmit weights by the cells in the transmission set of the UE, reference may be made to the manner of the prior art, and details are not described herein again.

It should be noted that, the solutions in the embodiments of the present invention are applicable to a system in which a downlink channel can be estimated according to an uplink channel. The system includes but is not limited to an LTE-TDD system and an improved LTE-FDD system. An uplink channel and a downlink channel are approximate in the LTE-TDD system, and therefore, information about the downlink channel can be acquired through estimation of the uplink channel. In the improved LTE-FDD system, a difference between the uplink channel and the downlink channel can be estimated and compensated; therefore, the information about the downlink channel may also be acquired through estimation of the uplink channel.

Figure 1:
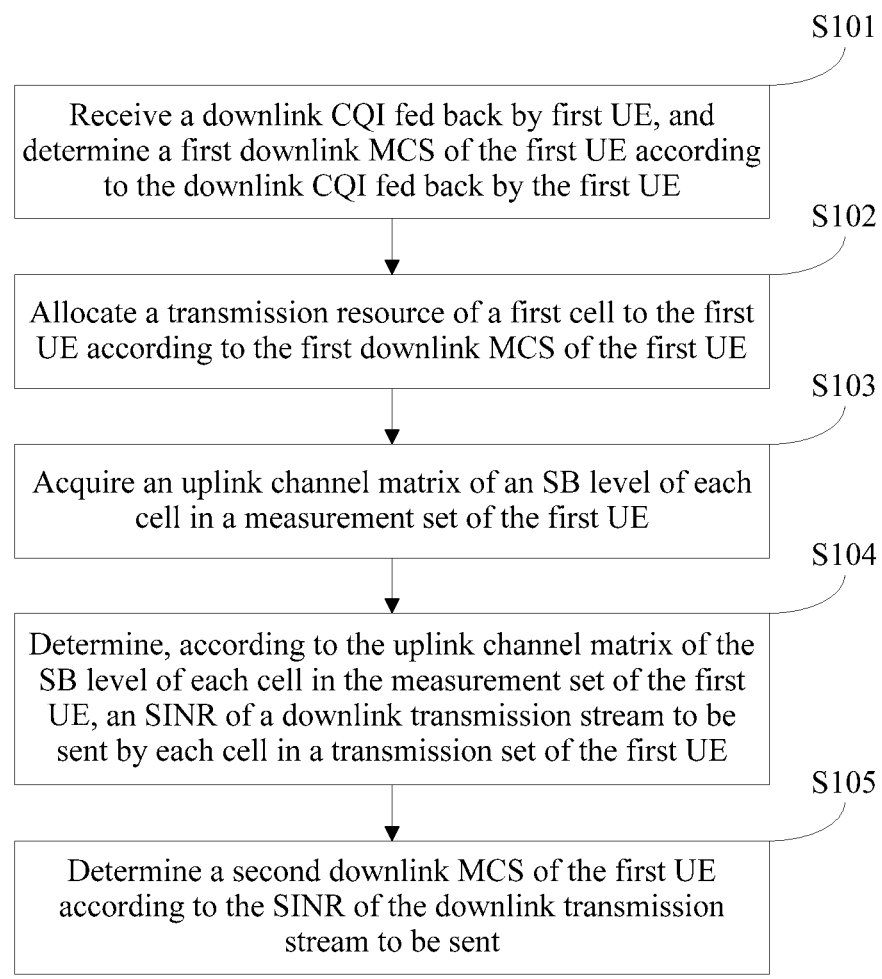
FIG. 1 is a flowchart of a data transmission method according to an embodiment of the present invention.

An embodiment of the present invention provides a data transmission method, where the method may be implemented by an eNB. Referring to FIG. 1, the method includes:

S101. Receive a downlink CQI fed back by first UE, and determine a first downlink MCS of the first UE according to the downlink CQI fed back by the first UE.

In this embodiment of the present invention, a serving cell of the first UE is called a first cell, and the first UE may be any UE in the first cell. It should be noted that, the UE in the first cell refers to UE in which the first cell is used as the serving cell.

In specific implementation, the eNB generally receives downlink CQIs fed back by all UEs in the first cell, and determines a first downlink MCS of each UE according to the downlink CQI fed back by each UE in the first cell.

S102. Allocate a transmission resource of a first cell to the first UE according to the first downlink MCS of the first UE.

The transmission resource may be an SB, where the SB may be a resource block (Resource Block, RB for short), or may be a combination of multiple RBs.

Specifically, S102 includes:

allocating the transmission resource of the first cell to the first UE according to the first downlink MCSs of all the UEs in the first cell and based on a proportional fair (Proportional Fair, PF for short) algorithm or based on a round robin (Round Robin, RR for short) algorithm.

S103. Acquire an uplink channel matrix of a sub-bandwidth (Sub-Bandwidth, SB for short) level of each cell in a measurement set of the first UE.

The uplink channel matrix of the SB level of each cell in the measurement set of the first UE may be determined according to an SRS sent by the first UE to a first base station. The first base station is a base station to which each cell in the measurement set of the first UE belongs.

In this embodiment, the uplink channel matrix of the SB level of each cell indicates an uplink channel estimated by each cell on each SB ($N_{SB}$ SBs in total), where sb is an SB number, $sb \in \{x | 1 \leq x \leq N_{SB}\}$, and $N_{SB}$ is a quantity of the SBs in the transmission resource.

S104. Determine, according to the uplink channel matrix of the SB level of each cell in the measurement set of the first UE, a signal to interference plus noise ratio (Signal to Interference plus Noise Ratio, SINR for short) of a downlink transmission stream to be sent by each cell in a transmission set of the first UE.

For example, S104 may be implemented in the following manner: determining, according to the uplink channel matrix of the SB level of each cell in the measurement set of the first UE, interference and noise power of the SB level of a cell outside the measurement set of the first UE for the downlink transmission stream to be sent; and determining, according to the uplink channel matrix of the SB level of each cell in the measurement set of the first UE and the interference and noise power of the SB level of the cell outside the measurement set of the first UE for the downlink transmission stream to be sent, the SINR of the downlink transmission stream to be sent by each cell in the transmission set of the first UE.

S105. Determine a second downlink MCS of the first UE according to the SINR of the downlink transmission stream to be sent.

In this embodiment of the present invention, an uplink channel matrix of an SB level of each cell in a measurement set of first UE is acquired; and an SINR of a downlink transmission stream to be sent by each cell in a transmission set of the first UE is determined according to the uplink channel matrix of the SB level of each cell in the measurement set of the first UE; and then a second downlink MCS of the first UE is determined according to the SINR of the downlink transmission stream to be sent. That is, in this embodiment of the present invention, a downlink channel is estimated by using an uplink channel. In this manner, in a system (for example, an LTE-TDD system) in which an uplink channel and a downlink channel are approximate, a second downlink MCS that is more accurate than a first downlink MCS may be obtained. As a result, downlink channel quality can be fully used, and transmission efficiency is improved. In addition, in this embodiment of the present invention, the SINR of the downlink transmission stream to be sent by each cell in the transmission set of the first UE is determined according to the uplink channel matrix of the SB level of each cell in the measurement set of the first UE, and the second downlink MCS of the first UE is determined according to the SINR of the downlink transmission stream to be sent, which avoids a problem that a downlink MCS determined by using a quantized value (CQI) is inaccurate in the prior art.

Figure 2A:
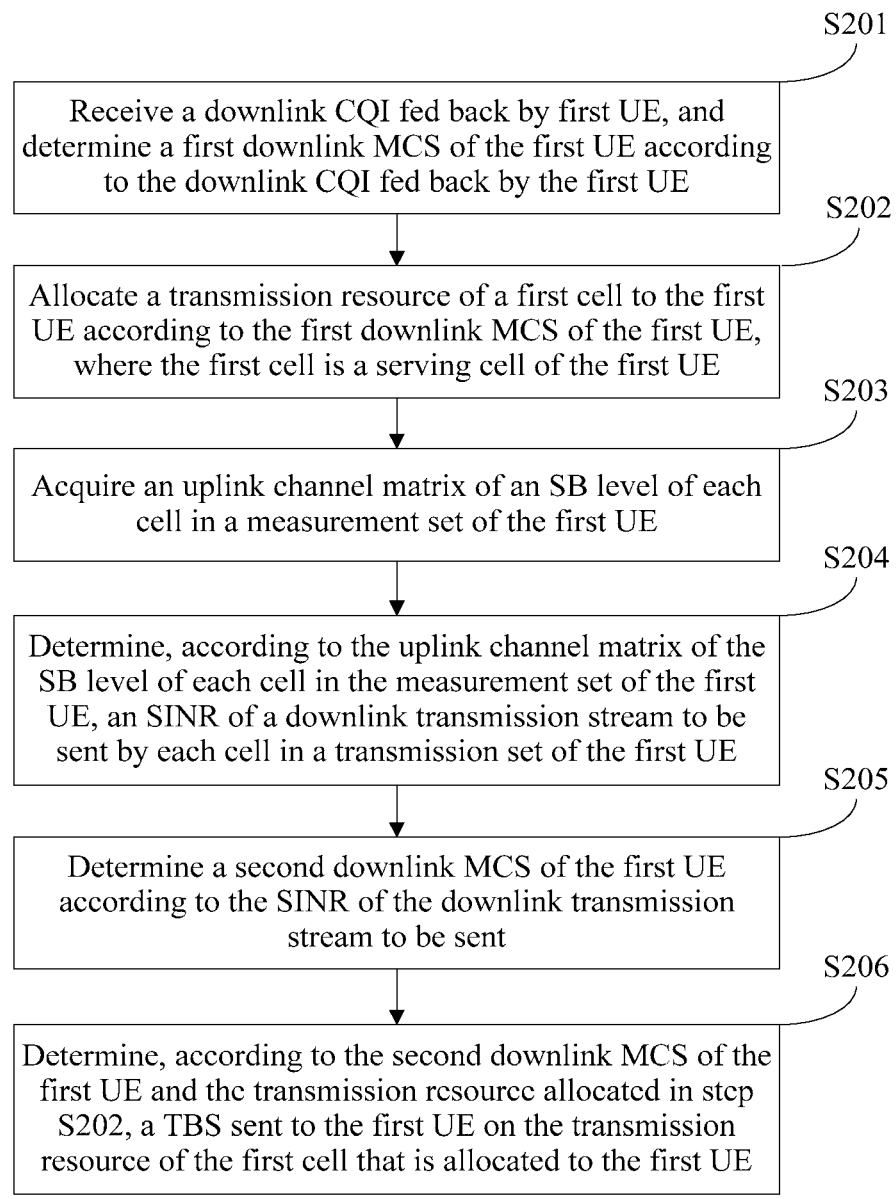
FIG. 2a is a flowchart of a data transmission method according to an embodiment of the present invention.

An embodiment of the present invention provides a data transmission method, where the method may be implemented by an eNB. Referring to FIG. 2a, the method includes:

S201. Receive a downlink CQI fed back by first UE, and determine a first downlink MCS of the first UE according to the downlink CQI fed back by the first UE.

Specifically, S201 may be implemented in the following manner: determining the first downlink MCS according to a correspondence between the downlink CQI and the downlink MCS by using the downlink CQI.

Further, a correspondence between a downlink CQI and a downlink MCS is generally provided by a base station manufacturer, where the correspondence may be in a form of a table, and each CQI corresponds to one downlink MCS. In specific implementation, an acquired CQI may be directly used for table lookup to obtain a downlink MCS corresponding to the CQI; or filtering may be first performed on an acquired CQI and then table lookup is performed to obtain a downlink MCS corresponding to the CQI.

S202. Allocate a transmission resource of a first cell to the first UE according to the first downlink MCS of the first UE, where the first cell is a serving cell of the first UE.

The transmission resource may be an SB, where the SB may be an RB, or may be a combination of multiple RBs.

In specific implementation, S202 may include:

allocating the transmission resource of the first cell to the first UE according to the first downlink MCSs of all UEs in the first cell and based on a PF algorithm or based on an RR algorithm.

Specifically, the allocating the transmission resource to the first UE according to a PF algorithm includes: determining an initial priority of each UE in the first cell on an SB of the first cell according to the first downlink MCSs and historical transmission rates of all the UEs in the first cell; and allocating the SB to the first UE according to the initial priority of the first UE.

Specifically, the process of allocating the transmission resource to the first UE according to an RR algorithm is as follows: determining a priority queue of each UE in the first cell on an SB of the first cell according to the first downlink MCSs and historical transmission rates of all the UEs in the first cell; allocating the SB of the first cell to all the UEs in the first cell according to a resource request sent by each UE in the first cell and the priority queue; and when the first UE is located in a first position of the priority queue, allocating the SB to the first UE, and adjusting the position of the first UE in the priority queue.

S203. Acquire an uplink channel matrix of an SB level of each cell in a measurement set of the first UE.

The uplink channel matrix of the SB level of each cell in the measurement set of the first UE may be determined according to an SRS sent by the first UE to a first base station. The first base station is a base station to which each cell in the measurement set of the first UE belongs.

In this embodiment of the present invention, a measurement set of UE includes M cells, $\mu_M=\{x|1\leq x\leq M\}$, and $\mu_M$ is the measurement set of the UE. In the measurement set of the UE, a cell number m and a first cell (a cell whose number is m=1) in the measurement set of the UE is a serving cell of the UE. Total power of transmit antennas of an m-th cell in the measurement set of the UE is $P_m$. A transmission set of UE includes T cells, $\mu_T=\{x|1\leq x\leq T\}$, $\mu_T\in\mu_M$, $\mu_T$ is the transmission set of the UE, a cell number in the transmission set of the UE, $t\in\mu_T$, and a first cell (a cell whose number is t=1) in the transmission set of the UE is a serving cell of the UE. A stream quantity of downlink transmission streams to be sent by a cell in the transmission set of the UE is $S_{tx}$, and a stream number $s_{tx}\in\{x|1\leq x\leq S_{tx}\}$. A stream quantity of downlink transmission streams assumed by the UE is $S_{fb}$, and a stream number $s_{fb}\in\{x|1\leq x\leq S_{fb}\}$. If a downlink transmission mode assumed by the UE is transmit diversity, $S_{fb}=1$; if a downlink transmission mode assumed by the UE is closed-loop spatial multiplexing, $S_{fb}\geq 1$.

Optionally, the cell in the measurement set of the UE may be a cell adjacent to the serving cell of the UE, or the cell in the measurement set of the UE may be determined in the following manner: determining that the cell in the measurement set of the UE is a cell satisfying a formula (1):

$$|RSRP_1 - RSRP_i| < Thr, \qquad (1)$$

where, $RSRP_1$ is reference signal received power (Reference Signal Receiving Power, RSRP for short) of the serving cell of the UE, $RSRP_i$ is an RSRP of another cell than the serving cell of the UE, and Thr is a set threshold, where a value of the threshold may be set according to an actual requirement, which is not limited in this embodiment of the present invention.

It should be noted that, the foregoing method for determining the cell in the measurement set of the UE is only an example and is not intended for limiting the present invention.

Specifically, the process of determining the uplink channel matrix of the SB level of each cell in the measurement set of the first UE according to the SRS sent by the first UE to the first base station is as follows:

receiving, by the first base station, the SRS sent by the first UE;

determining, by the first base station, an uplink channel of the SB level of each cell in the measurement set of the first UE according to a least square (Least Square, LS for short) channel estimation method; and acquiring, by a base station to which the first cell belongs, the uplink channel of the SB level of each cell in the measurement set of the first UE to constitute the uplink channel matrix of the SB level of each cell in the measurement set of the first UE.

Specifically, a formula used in the foregoing LS channel estimation method is H=R*S', where H is an estimated uplink channel, R is an SRS received by the first base station, S' is a conjugate signal of S, and S is the SRS sent by the first UE.

It should be noted that the LS channel estimation method is only an example, and that another channel estimation method may also be used.

S204. Determine, according to the uplink channel matrix of the SB level of each cell in the measurement set of the first UE, an SINR of a downlink transmission stream to be sent by each cell in a transmission set of the first UE.

Figure 2B:
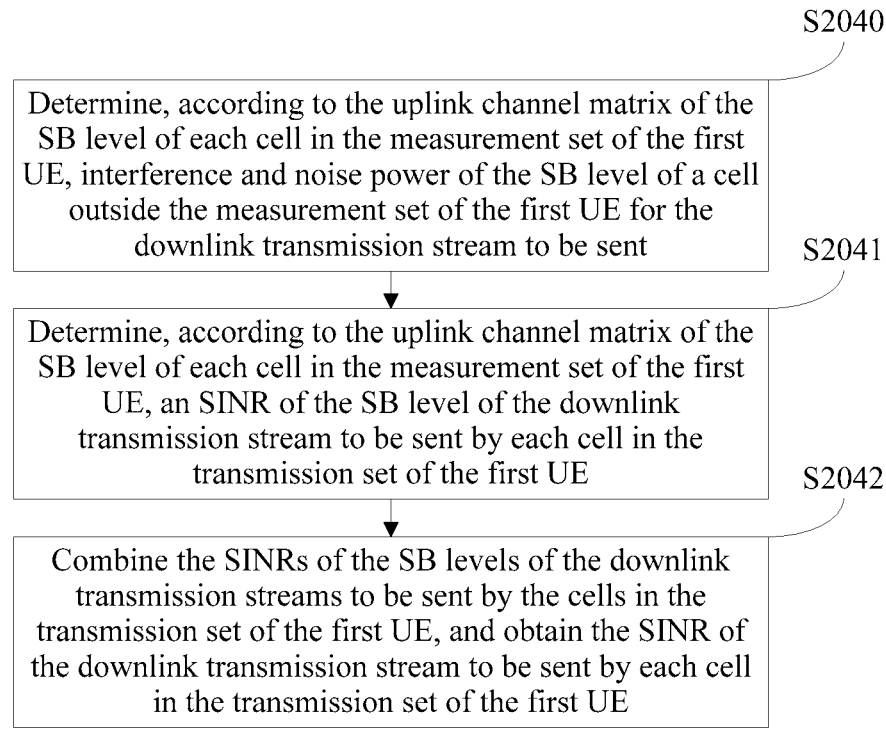
FIG. 2b is a flowchart of a data transmission method according to an embodiment of the present invention.

Specifically, referring to FIG. 2b, S204 may include:

S2041. Determine, according to the uplink channel matrix of the SB level of each cell in the measurement set of the first UE, an SINR of the SB level of the downlink transmission stream to be sent by each cell in the transmission set of the first UE.

The SINR of the SB level of the downlink transmission stream to be sent by each cell refers to an SINR of the downlink transmission stream to be sent by each cell on each SB.

In an implementation manner of this embodiment, before S2041, the method may further include: setting interference and noise power of the SB level of a cell outside the measurement set of the first UE to 0 for the downlink transmission stream to be sent.

In another implementation manner of this embodiment, before S2041, the method may further include S2040: Determine, according to the uplink channel matrix of the SB level of each cell in the measurement set of the first UE, interference and noise power of the SB level of a cell outside the measurement set of the first UE for the downlink transmission stream to be sent.

Optionally, an implementation manner of S2040 may include: determining, according to the uplink channel matrix of the SB level of each cell in the measurement set of the first UE, interference and noise power of the SB level of a cell in the measurement set of the first UE for the downlink transmission stream to be sent; and determining, according to the interference and noise power of the SB level of the cell in the measurement set of the first UE for the downlink transmission stream to be sent, the interference and noise power of the SB level of the cell outside the measurement set of the first UE for the downlink transmission stream to be sent.

Specifically, the determining, according to the uplink channel matrix of the SB level of each cell in the measurement set of the first UE, interference and noise power of the SB level of a cell in the measurement set of the first UE for the downlink transmission stream to be sent may include:

determining, according to the following formula (2), the interference and noise power of the SB level of the cell in the measurement set of the first UE for the downlink transmission stream to be sent:

$$P_{inside}^{sb} = \text{mean}\left\{\text{diag}\left(\sum_{\substack{m \in \mu_M \\ m \notin \mu_T}} ((H_m^{sb})^H (H_m^{sb}))\right)\right\}, \qquad (2)$$

where, $P_{inside}^{sb}$ is interference and noise power of an sb-th SB of the cell in the measurement set of the first UE for the downlink transmission stream to be sent, $H_{m,\textit{eff}}^{sb} = \sqrt{P_m} H_m^{sb} W_m^{sb}$; $P_m$ is total power of transmit antennas of an m-th cell, $H_m^{sb}$ an uplink channel matrix of the sb-th SB of the m-th cell, $W_m^{sb}$ is a transmit weight matrix of the sb-th SB to be used for current scheduling in the m-th cell, m is a cell number in the measurement set of the first UE, $\mu_M$ is the measurement set of the first UE, $\mu_T$ is the transmission set of the first UE, mean is matrix averaging generally used to obtain a mean value of each column, diag indicates a diagonal element, and $(*)^H$ indicates a conjugate transpose of $*$.

Specifically, the determining, according to the interference and noise power of the SB level of the cell in the measurement set of the first UE for the downlink transmission stream to be sent, the interference and noise power of the SB level of the cell outside the measurement set of the first UE for the downlink transmission stream to be sent may include: determining, according to the following formula (3), the interference and noise power of the SB level of the cell outside the measurement set of the first UE for the downlink transmission stream to be sent:

$$P_{outside}^{sb} = \alpha P_{inside}^{sb}, \qquad (3)$$

where, $P_{outside}^{sb}$ is interference and noise power of the sb-th SB of the cell outside the measurement set of the first UE for the downlink transmission stream to be sent $P_{inside}^{sb}$ is the interference and noise power of the sb-th SB of the cell in the measurement set of the first UE for the downlink transmission stream to be sent, and α indicates an interference ratio coefficient of interference outside the measurement set of the first UE to interference in the measurement set of the first UE, and generally $0 \leq \alpha \leq 4$.

Optionally, another implementation manner of S2040 may include: determining, according to the uplink channel matrix of the SB level of each cell in the measurement set of the first UE, interference and noise power of the SB level of the cell outside the measurement set of the first UE for the $s_{fb}$-th assumed downlink transmission stream; and determining, according to the interference and noise power of the SB level of the cell outside the measurement set of the first UE for the $s_{fb}$-th assumed downlink transmission stream, interference and noise power of the SB level of the cell outside the measurement set of the first UE for the $s_{tx}$-th downlink transmission stream to be sent.

A downlink CQI corresponding to the $s_{fb}$-th assumed downlink transmission stream may be obtained according to a first signal to noise ratio or may be obtained according to a second signal to noise ratio. The first signal to noise ratio is a ratio of a downlink pilot signal (Downlink Pilot Time Slot, DwPTS for short) of the first cell to interference and noise power of another cell than the first cell, and the second signal to noise ratio is a ratio of the downlink DwPTS of the first cell to interference and noise power of the cell outside the measurement set of the first UE. When a protocol version number used by a cell in the transmission set of the first UE for transmitting data is R8, R9, or R10, the first UE assumes that other cells than the first cell are all interference cells, and the downlink CQI corresponding to the $s_{fb}$-th assumed downlink transmission stream is obtained according to the first signal to noise ratio; when a protocol version number used by a cell in the transmission set of the first UE for transmitting data is R11, the first UE assumes that no interference exists in the measurement set of the first UE, and the downlink CQI corresponding to the $s_{fb}$-th assumed downlink transmission stream is obtained according to the second signal to noise ratio.

Optionally, when the downlink CQI corresponding to the $s_{fb}$-th assumed downlink transmission stream is obtained according to the first signal to noise ratio, the determining, according to the uplink channel matrix of the SB level of each cell in the measurement set of the first UE, interference and noise power of the SB level of the cell outside the measurement set of the first UE for the $s_{fb}$-th assumed downlink transmission stream may include:

if a transmission mode assumed by the first UE is transmit diversity, determining, according to the following formula (4), the interference and noise power of the SB level of the cell outside the measurement set of the first UE for the $s_{fb}$-th assumed downlink transmission stream:

$$P_{outside}^{s_{fb},sb} = \frac{\frac{1}{T_{num}}\left\|\sqrt{P_1}H_1^{sb}V_1^{CRS}\right\|_F^2}{SINR_{outside}^{s_{fb},sb}} - \sum_{\substack{m\in\mu_M \\ m\neq 1}}\left\|\sqrt{P_m}H_m^{sb}W_{m,last}^{sb}\right\|_F^2, \quad (4)$$

where, $P_{outside}^{s_{fb},sb}$ is interference and noise power of an sb-th SB of the cell outside the measurement set of the first UE for the $s_{fb}$-th assumed downlink transmission stream, $T_{num}$ is a quantity of transmit antennas of the first cell, $P_m$ is total power of transmit antennas of an m-th cell, $H_m^{sb}$ is an uplink channel matrix of the sb-th SB of the m-th cell, $V_1^{CRS}$ is a virtual antenna mapping (Virtual Antenna Mapping, VAM for short) matrix of a cell reference signal (Cell Reference Signal, CRS) of the first cell, $SINR_{outside}^{s_{fb},sb}$ is a signal to noise ratio that is of the sb-th SB of the cell outside the measurement set of the first UE for the $s_{fb}$-th assumed downlink transmission stream and that is obtained through mapping according to the downlink CQI corresponding to the $s_{fb}$-th assumed downlink transmission stream, $W_{m,last}^{sb}$ is a transmit weight matrix of the sb-th SB used before current scheduling in the m-th cell, m is a cell number in the measurement set of the first UE, $\mu_M$ is the measurement set of the first UE, $\Sigma*$ indicates a summation of *, and $\|*\|_F^2$ indicates extraction of square root for a quadratic sum of all elements of *; or if a transmission mode assumed by the first UE is closed-loop spatial multiplexing, determining, according to the following formula (5), the interference and noise power of the SB level of the cell outside the measurement set of the first UE for the $s_{fb}$-th assumed downlink transmission stream:

$$P_{outside}^{s_{fb},sb} = \frac{\left\|\sqrt{P_1}H_1^{sb}V_1^{CRS}PMI_1^{s_{fb},sb}\right\|_F^2}{SINR_{outside}^{s_{fb},sb}} - \frac{\sum_{\substack{m\in\mu_M \\ m\neq 1}}\left(\left\|\left(\sqrt{P_1}H_1^{sb}V_1^{CRS}PMI_1^{s_{fb},sb}\right)^H\left(\sqrt{P_m}H_m^{sb}W_{m,last}^{sb}\right)\right\|_F^2\right)}{\left\|\sqrt{P_1}H_1^{sb}V_1^{CRS}PMI_1^{s_{fb},sb}\right\|_F^2}, \quad (5)$$

where, $P_{outside}^{s_{fb},sb}$ is interference and noise power of an sb-th SB of the cell outside the measurement set of the first UE for the $s_{fb}$-th assumed downlink transmission stream, $P_m$ is total power of transmit antennas of an m-th cell, $H_m^{sb}$ is an uplink channel matrix of the sb-th SB of the m-th cell, $V_1^{CRS}$ is a VAM matrix of a CRS of the first cell, $SINR_{outside}^{s_{fb},sb}$ signal to noise ratio that is of the sb-th SB of the cell outside the measurement set of the first UE for the $s_{fb}$-th assumed downlink transmission stream and that is obtained through mapping according to the downlink CQI corresponding to the $s_{fb}$-th assumed downlink transmission stream, $W_{m,last}^{sb}$ is a transmit weight matrix of the sb-th SB used before current scheduling in the m-th cell, $PMI_1^{s_{fb},sb}$ is a precoding matrix index (Precoding Matrix Index, PMI for short) of the sb-th SB of the $s_{fb}$-th assumed downlink transmission stream, m is a cell number in the measurement set of the first UE, $\mu_M$ is the measurement set of the first UE, $\Sigma*$ indicates a summation of *, and $\|*\|_F^2$ indicates extraction of square root for a quadratic sum of all elements of *.

Optionally, when the downlink CQI corresponding to the $s_{fb}$-th assumed downlink transmission stream is obtained according to the second signal to noise ratio, the determining, according to the uplink channel matrix of the SB level of each cell in the measurement set of the first UE, interference and noise power of the SB level of the cell outside the measurement set of the first UE for the $s_{fb}$-th assumed downlink transmission stream may include:

if a transmission mode assumed by the first UE is transmit diversity, determining, according to the following formula (6), the interference and noise power of the SB level of the cell outside the measurement set of the first UE for the $s_{fb}$-th assumed downlink transmission stream:

$$P_{outside}^{s_{fb},sb} = \frac{\frac{1}{T_{num}}\left\|\sqrt{P_1}H_1^{sb}V_1^{CRS}\right\|_F^2}{SINR_{outside}^{s_{fb},sb}}, \quad (6)$$

where, $P_{outside}^{s_{fb},sb}$ is interference and noise power of an sb-th SB of the cell outside the measurement set of the first UE for the $s_{fb}$-th assumed downlink transmission stream, $T_{num}$ is a quantity of transmit antennas of the first cell, $P_m$ is total power of transmit antennas of an m-th cell, $H_m^{sb}$ is an uplink channel matrix of the sb-th SB of the m-th cell, $V_1^{CRS}$ is a VAM matrix of a CRS of the first cell, $SINR_{outside}^{s_{fb},sb}$ is a signal to noise ratio that is of the sb-th SB of the cell outside the measurement set of the first UE for the $s_{fb}$-th assumed downlink transmission stream and that is obtained through mapping according to the CQI corresponding to the $s_{fb}$-th assumed downlink transmission stream, and m is a cell number in the measurement set of the first UE;

if a transmission mode assumed by the first UE is closed-loop spatial multiplexing, and a transmission mode for sending a downlink transmission stream by a cell in the transmission set of the first UE is a transmission mode (Transmission Mode, TM for short) 8, determining, according to the following formula (7), the interference and noise power of the SB level of the cell outside the measurement set of the first UE for the $s_{fb}$-th assumed downlink transmission stream:

$$P_{outside}^{s_{fb},sb} = \frac{\left\|\sqrt{P_1}H_1^{sb}V_1^{CRS}PMI_1^{s_{fb},sb}\right\|_F^2}{SINR_{outside}^{s_{fb},sb}}, \quad (7)$$

where, $P_{outside}^{s_{fb},sb}$ is interference and noise power of an sb-th SB of the cell outside the measurement set of the first UE for the $s_{fb}$-th assumed downlink transmission stream, $P_m$ is total power of transmit antennas of an m-th cell, $H_m^{sb}$ is an uplink channel matrix of the sb-th SB of the m-th cell, $V_1^{CRS}$ is a VAM matrix of a CRS of the first cell, $SINR_{outside}^{s_{fb},sb}$ is a signal to noise ratio that is of the sb-th SB of the cell outside the measurement set of the first UE for the $s_{fb}$-th assumed downlink transmission stream and that is obtained through mapping according to the CQI corresponding to the $s_{fb}$-th assumed downlink transmission stream, $PMI_1^{s_{fb},sb}$ is a PMI of the sb-th SB of the $s_{fb}$-th assumed downlink transmission stream, and m is a cell number in the measurement set of the first UE; or if a transmission mode assumed by the first UE is closed-loop spatial multiplexing, and a transmission mode for sending a downlink transmission stream by a cell in the transmission set of the first UE is a TM9, determining, according to the following formula (8), the interference and noise power of the SB level of the cell outside the measurement set of the first UE for the $s_{fb}$-th assumed downlink transmission stream:

$$P_{outside}^{s_{fb},sb} = \frac{\left\| \sqrt{P_1} H_1^{sb} V_1^{CSI-RS} PMI_1^{s_{fb},sb} \right\|_F^2}{SINR_{outside}^{s_{fb},sb}}, \quad (8)$$

where, $P_{outside}^{s_{fb},sb}$ is interference and noise power of an sb-th SB of the cell outside the measurement set of the first UE for the $s_{fb}$-th assumed downlink transmission stream, $P_m$ is total power of transmit antennas of an m-th cell, $H_m^{sb}$ is an uplink channel matrix of the sb-th SB of the m-th cell, $V_1^{CSI-RS}$ is a VAM matrix of a channel state indication-reference signal (Channel State Indication-Reference Signal, CSI-RS) of the first cell, $SINR_{outside}^{s_{fb},sb}$ signal to noise ratio that is of the sb-th SB of the cell outside the measurement set of the first UE for the $s_{fb}$-th assumed downlink transmission stream and that is obtained through mapping according to the CQI corresponding to the $s_{fb}$-th assumed downlink transmission stream, $PMI_1^{s_{fb},sb}$ is a PMI of the sb-th SB of the $s_{fb}$-th assumed downlink transmission stream, m is a cell number in the measurement set of the first UE, and generally $V_1^{CSI-RS}=I$.

It should be noted that, a relationship between the transmission mode assumed by the first UE and a transmission mode of the downlink transmission stream to be sent is: when a transmission mode used for transmitting downlink data by a cell in the transmission set of the first UE is a TM7, the transmission mode assumed by the UE is transmit diversity; when a transmission mode used for transmitting downlink data by a cell in the transmission set of the first UE is the TM8 or TM9, if no PMI or rank indication (Rank Indication, RI for short) feedback is configured, the transmission mode assumed by the first UE is transmit diversity, or if a PMI/RI feedback is configured, the transmission mode assumed by the first UE is closed-loop spatial multiplexing.

Optionally, the determining, according to the interference and noise power of the SB level of the cell outside the measurement set of the first UE for the $s_{fb}$-th assumed downlink transmission stream, interference and noise power of the SB level of the cell outside the measurement set of the first UE for the $s_{tx}$-th downlink transmission stream to be sent may include: determining, according to the following formula (9), the interference and noise power of the SB level of the cell outside the measurement set of the first UE for the $s_{tx}$-th downlink transmission stream to be sent:

$$P_{outside}^{s_{tx},sb} = \frac{1}{S_{fb}} \sum_{s_{fb}=1}^{S_{fb}} P_{outside}^{s_{fb},sb}, \quad (9)$$

where, $P_{outside}^{s_{tx},sb}$ is interference and noise power of the sb-th SB of the cell outside the measurement set of the first UE for the $s_{tx}$-th downlink transmission stream to be sent, $P_{outside}^{s_{fb},sb}$ is the interference and noise power of the sb-th SB of the cell outside the measurement set of the first UE for the $s_{fb}$-th assumed downlink transmission stream, and $S_{fb}$ is a stream quantity of the assumed downlink transmission streams.

Optionally, when a stream quantity $S_{tx}$ of the downlink transmission streams to be sent is equal to a stream quantity $S_{fb}$ of the assumed downlink transmission streams, that is, $S_{tx}=S_{fb}$, the determining, according to the interference and noise power of the SB level of the cell outside the measurement set of the first UE for the $s_{fb}$-th assumed downlink transmission stream, interference and noise power of the SB level of the cell outside the measurement set of the first UE for the $s_{tx}$-th downlink transmission stream to be sent may include: determining, according to the following formula (10), the interference and noise power of the SB level of the cell outside the measurement set of the first UE for the $s_{tx}$-th downlink transmission stream to be sent:

$$P_{outside}^{s_{tx},sb} = P_{outside}^{s_{fb},sb}, \quad (10)$$

where, $P_{outside}^{s_{tx},sb}$ is interference and noise power of the sb-th SB of the cell outside the measurement set of the first UE for the $s_{tx}$-th downlink transmission stream to be sent, and $P_{outside}^{s_{fb},sb}$ is the interference and noise power of the sb-th SB of the cell outside the measurement set of the first UE for the $s_{fb}$-th assumed downlink transmission stream.

Optionally, still another implementation manner of S2040 may include: determining whether to calculate the interference and noise power of the SB level of the cell outside the measurement set of the first UE for the $s_{tx}$-th downlink transmission stream to be sent; if the interference and noise power of the SB level of the cell outside the measurement set of the first UE for the $s_{tx}$-th downlink transmission stream to be sent is not calculated, setting the interference and noise power of the SB level of the cell outside the measurement set of the first UE to 0 for the $s_{tx}$-th downlink transmission stream to be sent, that is, $P_{outside}^{s_{tx},sb}=0$, where $P_{outside}^{s_{tx},sb}$ is interference and noise power of an sb-th SB of the cell outside the measurement set of the first UE for the $s_{tx}$-th downlink transmission stream to be sent; and if the interference and noise power of the SB level of the cell outside the measurement set of the first UE for the $s_{tx}$-th downlink transmission stream to be sent is calculated, determining, according to the uplink channel matrix of the SB level of each cell in the measurement set of the first UE, interference and noise power of the SB level of the cell outside the measurement set of the first UE for the $s_{fb}$-th assumed downlink transmission stream, and determining, according to the interference and noise power of the SB level of the cell outside the measurement set of the first UE for the $s_{fb}$-th assumed downlink transmission stream, interference and noise power of the SB level of the cell outside the measurement set of the first UE for the $s_{tx}$-th downlink transmission stream to be sent.

Optionally, the determining whether to calculate the interference and noise power of the SB level of the cell outside the measurement set of the first UE for the $s_{tx}$-th downlink transmission stream to be sent may include: comparing a threshold with a quantity of code required for calculating the interference and noise power of the SB level of the cell outside the measurement set of the first UE for the $s_{tx}$-th downlink transmission stream to be sent; and if the quantity of code is greater than the threshold, not calculating the interference and noise power of the SB level of the cell outside the measurement set of the first UE for the $s_{tx}$-th downlink transmission stream to be sent; or if the quantity of code is less than the threshold, calculating the interference and noise power of the SB level of the cell outside the measurement set of the first UE for the $s_{tx}$-th downlink transmission stream to be sent.

Optionally, the determining whether to calculate the interference and noise power of the SB level of the cell outside the measurement set of the first UE for the $s_{tx}$-th downlink transmission stream to be sent may include: comparing M with $M_{Thr}$, and (M−T) with $I_{Thr}$ separately; and if $M > M_{Thr}$ and $(M-T) > I_{Thr}$, not calculating the interference and noise power of the SB level of the cell outside the measurement set of the first UE for the $s_{tx}$-th downlink transmission stream to be sent; or otherwise, calculating the interference and noise power of the SB level of the cell outside the measurement set of the first UE for the $s_{tx}$-th downlink transmission stream to be sent, where $M_{Thr}$ and $I_{Thr}$ are set thresholds, and generally, $M_{Thr}=3$ and $I_{Thr}=2$.

In an implementation manner of this embodiment, S2041 may include: determining, according to a maximum ratio combining (Max Ratio Combine, MRC for short) equalization algorithm, an SINR of the SB level of the $s_{tx}$-th downlink transmission stream to be sent by each cell in the measurement set of the first UE, where the determining formula (11) is as follows:

$$SINR^{s_{tx},sb} = \frac{\left(\|H_{1,e\!f\!f}^{s_{tx},sb}\|_F^2\right)^2}{\sum_{\substack{m\in\mu_M \\ m\notin\mu_T}} \left(\|(H_{1,e\!f\!f}^{s_{tx},sb})^H (H_{m,e\!f\!f}^{sb})\|_F^2\right) + \|H_{1,e\!f\!f}^{s_{tx},sb}\|_F^2 P_{outside}^{s_{tx},sb}}, \quad (11)$$

where, $SINR^{s_{tx},sb}$ is an SINR of an sb-th SB of the $s_{tx}$-th downlink transmission stream to be sent $$H_{1,e\!f\!f}^{s_{tx},sb} = \sum_{t\in\mu_T} \sqrt{P_t}\, H_t^{sb} W_t^{s_{tx},sb},$$

$H_{m,e\!f\!f}^{sb} = \sqrt{P_m} H_m^{sb} W_m^{sb}$; $P_m$ is total power of transmit antennas of an m-th cell, $H_m^{sb}$ is an uplink channel matrix of the sb-th SB of the m-th cell, $W_m^{sb}$ is a transmit weight matrix of the sb-th SB to be used for current scheduling in the m-th cell, the $s_{tx}$-th column of $W_t^{sb}$ is $W_t^{s_{tx},sb}$, $W_t^{s_{tx},sb}$ indicates a transmit weight vector of the sb-th SB of the $s_{tx}$-th downlink transmission stream to be sent in a t-th cell, $\mu_M$ is the measurement set, $\mu_T$ is the transmission set, m is a cell number in the measurement set of the first UE, and t is a cell number in the transmission set of the first UE.

In another implementation manner of this embodiment, S2041 may include: determining, according to an interference rejection combining (IRC for short) equalization algorithm, an SINR of the SB level of the $s_{tx}$-th downlink transmission stream to be sent by each cell in the measurement set of the first UE, where the determining formula (12) is as follows:

$$SINR^{s_{tx},sb} = \frac{|\alpha_{s_{tx},s_{tx}}|}{1-|\alpha_{s_{tx},s_{tx}}|}, \quad (12)$$

where, $\alpha_{s_{tx},s_{tx}}$ is an $s_{tx}$-th diagonal element of $\alpha$, $\alpha = (H_{1,e\!f\!f}^{sb})^H (H_{1,e\!f\!f}^{sb} (H_{1,e\!f\!f}^{sb})^H + R_{uu}^{sb})^{-1} H_{1,e\!f\!f}^{sb}$, $$R_{uu}^{sb} = \sum_{\substack{x\in\mu_M \\ x\notin\mu_T}}^{M} \left((H_{m,e\!f\!f}^{sb})^H (H_{m,e\!f\!f}^{sb})\right) + P_{outside}^{sb} I,$$

$P_m$ is total power of transmit antennas of an m-th cell, $H_m^{sb}$ is an uplink channel matrix of the sb-th SB of the m-th cell, $W_m^{sb}$ is a transmit weight matrix of the sb-th SB to be used for current scheduling in the m-th cell, $P_{outside}^{sb}$ is interference and noise power of the sb-th SB of the cell outside the measurement set of the first UE for the $s_{tx}$-th assumed downlink transmission stream, $$H_{1,e\!f\!f}^{sb} = \sum_{m\in\mu_T} \sqrt{P_m}\, H_m^{sb} W_m^{sb},$$

$H_{m,e\!f\!f}^{sb} = \sqrt{P_m} H_m^{sb} W_m^{sb}$, $\mu_M$ is the measurement set, $\mu_T$ is the transmission set, m is a cell number in the measurement set of the first UE, and t is a cell number in the transmission set of the first UE.

S2042. Combine the SINRs of the SB levels of the downlink transmission streams to be sent by the cells in the transmission set of the first UE, and obtain the SINR of the downlink transmission stream to be sent by each cell in the transmission set of the first UE.

In an implementation manner of this embodiment, S2042 may include: combining, according to an averaging method, SINRs of the SB levels of the $s_{tx}$-th downlink transmission streams to be sent by the cells in the measurement set of the first UE, where the combining formula (13) is as follows:

$$SINR^{s_{tx}} = \frac{1}{N_{SB}} \sum_{sb=1}^{N_{SB}} SINR^{s_{tx},sb}, \quad (13)$$

where, $SINR^{s_{tx}}$ is an SINR of the $s_{tx}$-th downlink transmission stream to be sent by each cell in the measurement set of the first UE, $N_{SB}$ is the quantity of the SBs in the transmission resource, and $SINR^{s_{tx},sb}$ is the SINR of the SB level of the $s_{tx}$-th downlink transmission stream to be sent by each cell in the measurement set of the first UE.

In another implementation manner of this embodiment, S2042 may include: combining, according to an exponential effective SINR mapping (Exponential Effective SINR Mapping, EESM for short) combining method, SINRs of the SB levels of the $s_{tx}$-th downlink transmission streams to be sent by the cells in the measurement set of the first UE, where the combining formula (14) is as follows:

$$SINR^{s_{tx}} = -\beta \ln\left[\frac{1}{N_{SB}} \sum_{sb=1}^{N_{SB}} \exp\left(-\frac{SINR^{s_{tx},sb}}{\beta}\right)\right], \quad (14)$$

where, $SINR^{s_{tx}}$ is an SINR of the $s_{tx}$-th downlink transmission stream to be sent by each cell in the measurement set of the first UE, $\beta$ is a scale factor related to the MCS, $N_{SB}$ is the quantity of the SBs in the transmission resource of the first cell, and $SINR^{s_{tx},sb}$ is the SINR of the SB level of the $s_{tx}$-th downlink transmission stream to be sent by each cell in the measurement set of the first UE.

S205. Determine a second downlink MCS of the first UE according to the SINR of the downlink transmission stream to be sent.

Specifically, S205 may be implemented in the following manner: selecting an MCS corresponding to a maximum $SINR_{MCS}$ that satisfies $SINR^{s_{tx}} \geq SINR_{MCS}$, as the second downlink MCS of the first UE.

$SINR^{s_{tx}}$ is the SINR of the $s_{tx}$-th downlink transmission stream to be sent by each cell in the measurement set of the first UE, and $SINR_{MCS}$ is the SINR corresponding to the MCS.

In still another implementation manner of this embodiment, the method further includes S206: Determine, according to the second downlink MCS of the first UE and the transmission resource allocated in S202, a transport block size (Transport Block Size, TBS for short) sent to the first UE on the transmission resource of the first cell that is allocated to the first UE.

In still another implementation manner of this embodiment, the method further includes: sending control signaling to the first UE, where the control signaling includes the second downlink MCS and transmission resource allocation information of the first UE, where the transmission resource allocation information is used to indicate the transmission resource of the first cell that is allocated to the first UE.

It is easily known that, in still another implementation manner of this embodiment, the method further includes: sending control signaling to the first UE, where the control signaling includes the second downlink MCS, transmission resource allocation information, and TBS of the first UE, where the transmission resource allocation information is used to indicate the transmission resource of the first cell that is allocated to the first UE.

It should be noted that, in this embodiment of the present invention, it is assumed that a receiving model of the SB level of the first UE is $$Y^{sb} = \sum_{t \in \mu_T} \sqrt{P_t} H_t^{sb} W_t^{sb} S_1 + \sum_{\substack{m \in \mu_M \\ m \notin \mu_T}} \sqrt{P_m} H_m^{sb} W_m^{sb} S_m + I_{outside}^{sb},$$

where $P_m$ is total power of transmit antennas of an m-th cell, $H_m^{sb}$ is an uplink channel matrix of the sb-th SB of the m-th cell, $W_m^{sb}$ is a transmit weight matrix of the sb-th SB to be used for current scheduling interference in the m-th cell, $I_{outside}^{sb}$ is interference outside an equivalent measurement set in which transmit power of the first UE is assumed to be 1, $\mu_M$ is the measurement set, $\mu_T$ is the transmission set, and $S_m$ is a transmission symbol of the SB level occupied by the m-th cell in the first UE.

In this embodiment of the present invention, an uplink channel matrix of an SB level of each cell in a measurement set of first UE is acquired; and an SINR of a downlink transmission stream to be sent by each cell in a transmission set of the first UE is determined according to the uplink channel matrix of the SB level of each cell in the measurement set of the first UE; and then a second downlink MCS of the first UE is determined according to the SINR of the downlink transmission stream to be sent. That is, in this embodiment of the present invention, a downlink channel is estimated by using an uplink channel. In this manner, in a system (for example, an LTE-TDD system) in which an uplink channel and a downlink channel are approximate, a second downlink MCS that is more accurate than a first downlink MCS may be obtained. As a result, downlink channel quality can be fully used, and transmission efficiency is improved. In addition, in this embodiment of the present invention, the SINR of the downlink transmission stream to be sent by each cell in the transmission set of the first UE is determined according to the uplink channel matrix of the SB level of each cell in the measurement set of the first UE, and the second downlink MCS of the first UE is determined according to the SINR of the downlink transmission stream to be sent, which avoids a problem that a downlink MCS determined by using a quantized value (CQI) is inaccurate in the prior art, so that the obtained second downlink MCS is more accurate than the first downlink MCS. Further, in this embodiment of the present invention, according to the second downlink MCS of the first UE and a transmission resource of the first cell that is allocated to the first UE, a TBS sent to the first UE on the transmission resource is determined. Because the second downlink MCS is more accurate than the first downlink MCS, accuracy of calculating the TBS can be improved, and transmission efficiency is further improved.

Figure 3:
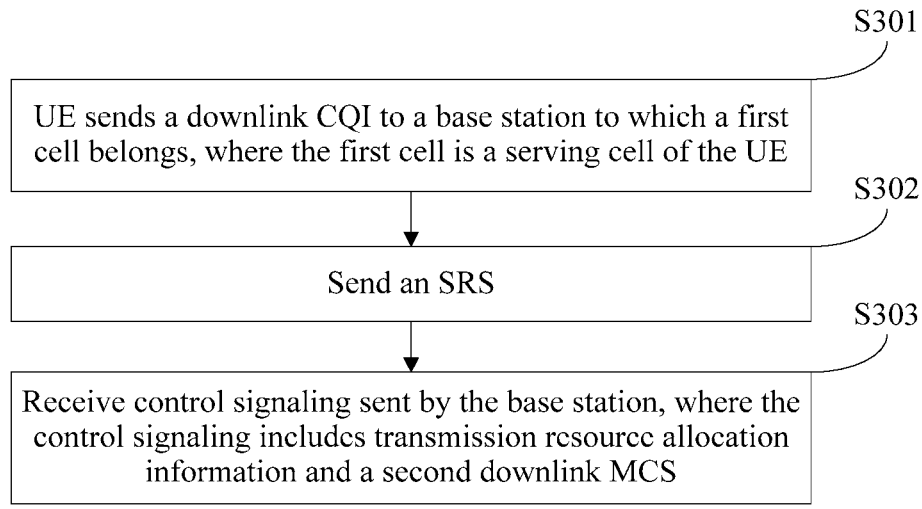
FIG. 3 is a flowchart of a data transmission method according to an embodiment of the present invention.

An embodiment of the present invention provides a data transmission method, where the method may be implemented by UE. Referring to FIG. 3, the method includes:

S301. Send a downlink CQI to a base station to which a first cell belongs, where the first cell is a serving cell of the UE.

S302. Send an SRS to a first base station, where the first base station is a base station to which each cell in a measurement set of the UE belongs.

In this embodiment, the SRS is sent periodically, and therefore, no sequence exists between S302 and S301.

S303. Receive transmission resource allocation information and a second downlink MCS that are sent by the base station.

In this embodiment, the transmission resource allocation information is used to indicate a transmission resource of the first cell that is allocated by the base station to the UE, where the transmission resource is allocated, after the base station determines a first downlink MCS according to the downlink CQI sent by the UE, to the UE according to the first downlink MCS, and the second downlink MCS is determined by the base station in the following manner: acquiring an uplink channel matrix of an SB level of each cell in the measurement set of the UE; determining, according to the uplink channel matrix of the SB level of each cell in the measurement set of the UE, an SINR of a downlink transmission stream to be sent by each cell in a transmission set of the UE; and determining the second downlink MCS of the UE according to the SINR of the downlink transmission stream to be sent; where the uplink channel matrix of the SB level of each cell in the measurement set of the UE is determined according to the SRS sent by the UE to the first base station, and the transmission set of the UE is a subset of the measurement set of the UE.

In an implementation manner of this embodiment of the present invention, S303 may further include: receiving control signaling sent by the base station, where the control signaling includes the transmission resource allocation information and the second downlink MCS.

In an implementation manner of this embodiment of the present invention, the method may further include: determining, by the UE according to the transmission resource allocation information and the second downlink MCS that are received, a TBS sent by the base station to the UE on the transmission resource of the first cell that is allocated to the UE.

It is easily known that, in an implementation manner of this embodiment of the present invention, the method may further include: receiving control signaling sent by the base station, where the control signaling includes the second downlink MCS, transmission resource allocation information, and TBS of the first UE, where the transmission resource allocation information is used to indicate the transmission resource of the first cell that is allocated to the first UE, so that the UE obtains the TBS from the control signaling.

In this embodiment of the present invention, an uplink channel matrix of an SB level of each cell in a measurement set of UE is acquired; and an SINR of a downlink transmission stream to be sent by each cell in a transmission set of the UE is determined according to the uplink channel matrix of the SB level of each cell in the measurement set of the UE; and then a second downlink MCS of the UE is determined according to the SINR of the downlink transmission stream to be sent. That is, in this embodiment of the present invention, a downlink channel is estimated by using an uplink channel. In this manner, in a system (for example, an LTE-TDD system) in which an uplink channel and a downlink channel are approximate, a second downlink MCS that is more accurate than a first downlink MCS may be obtained. As a result, downlink channel quality can be fully used, and transmission efficiency is improved. In addition, in this embodiment of the present invention, the SINR of the downlink transmission stream to be sent by each cell in the transmission set of the UE is determined according to the uplink channel matrix of the SB level of each cell in the measurement set of the UE, and the second downlink MCS of the UE is determined according to the SINR of the downlink transmission stream to be sent, which avoids a problem that a downlink MCS determined by using a quantized value (CQI) is inaccurate in the prior art, so that the obtained second downlink MCS is more accurate than the first downlink MCS. Further, in this embodiment of the present invention, according to the second downlink MCS of the UE and a transmission resource of the first cell that is allocated to the UE, a TBS sent to the UE on the transmission resource is determined. Because the second downlink MCS is more accurate than the first downlink MCS, accuracy of calculating the TBS can be improved, and transmission efficiency is further improved.

It may be understood that, for an implementation manner and interaction manner of each component in the data transmission apparatus in the foregoing embodiment, reference may be made to the related description in a corresponding method embodiment.

Figure 4:
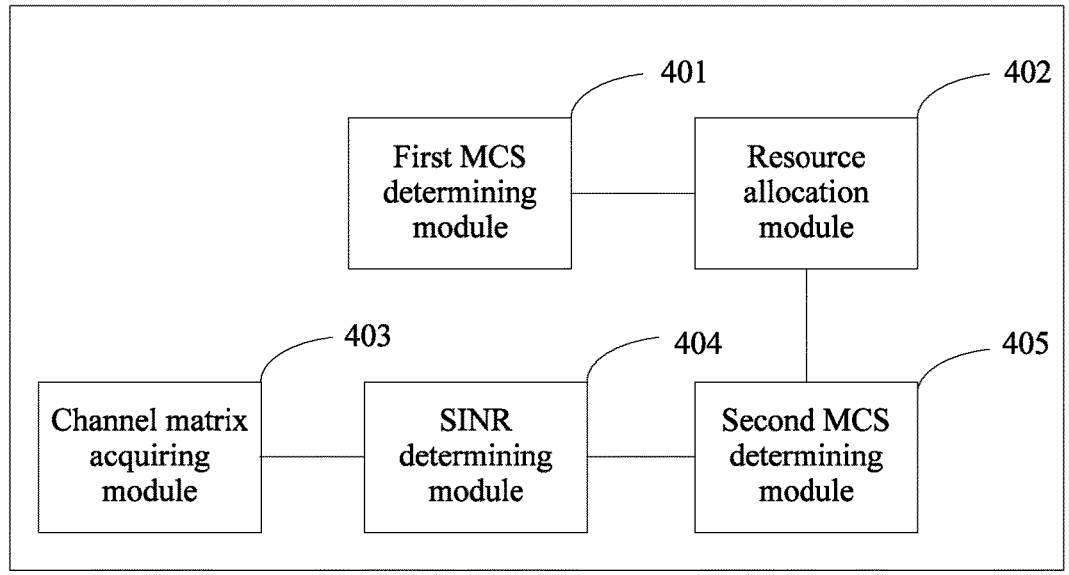
FIG. 4 is a schematic structural diagram of a data transmission apparatus according to an embodiment of the present invention.

An embodiment of the present invention provides a data transmission apparatus, where the apparatus may be an eNB. Referring to FIG. 4, the apparatus includes:

a first MCS determining module 401, configured to receive a downlink CQI fed back by first UE, and determine a first downlink MCS of the first UE according to the downlink CQI fed back by the first UE;

a resource allocation module 402, configured to allocate a transmission resource of a first cell to the first UE according to the first downlink MCS of the first UE that is determined by the first MCS determining module 401, where the first cell is a serving cell of the first UE;

a channel matrix acquiring module 403, configured to acquire an uplink channel matrix of an SB level of each cell in a measurement set of the first UE, where the uplink channel matrix of the SB level of each cell in the measurement set of the first UE is determined according to an SRS sent by the first UE to a first base station;

an SINR determining module 404, configured to determine, according to the uplink channel matrix that is of the SB level of each cell in the measurement set of the first UE and that is acquired by the channel matrix acquiring module 403, an SINR of a downlink transmission stream to be sent by each cell in a transmission set of the first UE; and a second MCS determining module 405, configured to determine a second downlink MCS of the first UE according to the SINR that is of the downlink transmission stream to be sent and that is determined by the SINR determining module 404.

In this embodiment of the present invention, an uplink channel matrix of an SB level of each cell in a measurement set of first UE is acquired; and an SINR of a downlink transmission stream to be sent by each cell in a transmission set of the first UE is determined according to the uplink channel matrix of the SB level of each cell in the measurement set of the first UE; and then a second downlink MCS of the first UE is determined according to the SINR of the downlink transmission stream to be sent. That is, in this embodiment of the present invention, a downlink channel is estimated by using an uplink channel. In this manner, in a system (for example, an LTE-TDD system) in which an uplink channel and a downlink channel are approximate, a second downlink MCS that is more accurate than a first downlink MCS may be obtained. As a result, downlink channel quality can be fully used, and transmission efficiency is improved. In addition, in this embodiment of the present invention, the SINR of the downlink transmission stream to be sent by each cell in the transmission set of the first UE is determined according to the uplink channel matrix of the SB level of each cell in the measurement set of the first UE, and the second downlink MCS of the first UE is determined according to the SINR of the downlink transmission stream to be sent, which avoids a problem that a downlink MCS determined by using a quantized value (CQI) is inaccurate in the prior art.

Figure 5:
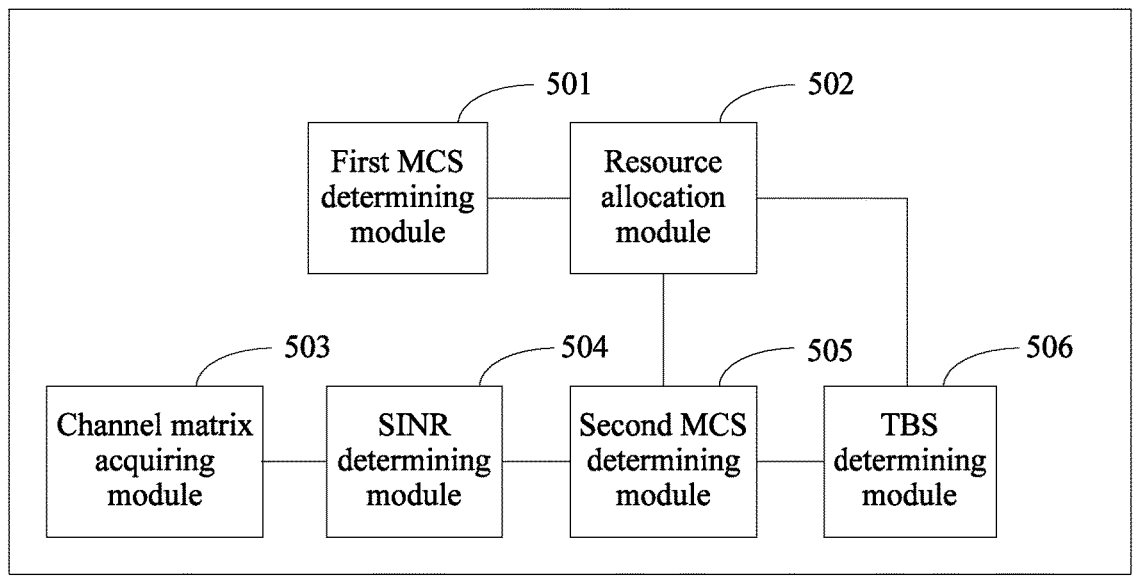
FIG. 5 is a schematic structural diagram of a data transmission apparatus according to an embodiment of the present invention.

An embodiment of the present invention provides a data transmission apparatus, where the apparatus may be an eNB. Referring to FIG. 5, the apparatus includes:

a first MCS determining module 501, configured to receive a downlink CQI fed back by first UE, and determine a first downlink MCS of the first UE according to the downlink CQI fed back by the first UE;

a resource allocation module 502, configured to allocate a transmission resource of a first cell to the first UE according to the first downlink MCS of the first UE that is determined by the first MCS determining module 501, where the first cell is a serving cell of the first UE;

a channel matrix acquiring module 503, configured to acquire an uplink channel matrix of an SB level of each cell in a measurement set of the first UE, where the uplink channel matrix of the SB level of each cell in the measurement set of the first UE is determined according to an SRS sent by the first UE to a first base station;

an SINR determining module 504, configured to determine, according to the uplink channel matrix that is of the SB level of each cell in the measurement set of the first UE and that is acquired by the channel matrix acquiring module 503, an SINR of a downlink transmission stream to be sent by each cell in a transmission set of the first UE; and a second MCS determining module 505, configured to determine a second downlink MCS of the first UE according to the SINR that is of the downlink transmission stream to be sent and that is determined by the SINR determining module 504.

Specifically, the first MCS determining module 501 is configured to determine the first downlink MCS according to a correspondence between the CQI and the downlink MCS by using the downlink CQI.

Optionally, the resource allocation module 502 is configured to allocate the transmission resource to the first UE according to the first downlink MCSs of all UEs in the first cell and based on a PF algorithm or based on an RR algorithm.

Specifically, the resource allocation module 502 may be configured to: determine an initial priority of each UE in the first cell on an SB of the first cell according to the first downlink MCSs and historical transmission rates of all the UEs in the first cell, and allocate the SB to the first UE according to the initial priority of the first UE.

Specifically, the resource allocation module 502 may be configured to: determine a priority queue of each UE in the first cell on an SB of the first cell according to the first downlink MCSs and historical transmission rates of all the UEs in the first cell; allocate the SB of the first cell to all the UEs in the first cell according to a resource request sent by each UE in the first cell and the priority queue; and when the first UE is located in a first position of the priority queue, allocate the SB to the first UE and adjust the position of the first UE in the priority queue.

In an implementation manner of this embodiment, the SINR determining module 504 may include:

a first SINR determining unit, configured to determine, according to the uplink channel matrix that is of the SB level of each cell in the measurement set of the first UE and that is acquired by the channel matrix acquiring module 503, an SINR of the SB level of the downlink transmission stream to be sent by each cell in the transmission set of the first UE; and a second SINR determining unit, configured to: combine the SINRs that are of the SB levels of the downlink transmission streams to be sent by the cells in the transmission set of the first UE and that are determined by the first SINR determining unit, and obtain the SINR of the downlink transmission stream to be sent by each cell in the transmission set of the first UE.

In another implementation manner of this embodiment, the SINR determining module 504 may further include a first noise determining unit, configured to: before the first SINR determining unit determines, according to the uplink channel matrix that is of the SB level of each cell in the measurement set of the first UE and that is acquired by the channel matrix acquiring module 503, the SINR of the SB level of the downlink transmission stream to be sent by each cell in the transmission set of the first UE, set interference and noise power of the SB level of a cell outside the measurement set of the first UE to 0 for the downlink transmission stream to be sent.

In still another implementation manner of this embodiment, the SINR determining module 504 may further include a second noise determining unit, configured to: before the first SINR determining unit determines, according to the uplink channel matrix that is of the SB level of each cell in the measurement set of the first UE and that is acquired by the channel matrix acquiring module 503, the SINR of the SB level of the downlink transmission stream to be sent by each cell in the transmission set of the first UE, determine, according to the uplink channel matrix that is of the SB level of each cell in the measurement set of the first UE and that is acquired by the channel matrix acquiring module 503, interference and noise power of the SB level of a cell outside the measurement set of the first UE for the downlink transmission stream to be sent.

Optionally, the second noise determining unit may include:

a first noise determining subunit, configured to determine, according to the uplink channel matrix that is of the SB level of each cell in the measurement set of the first UE and that is acquired by the channel matrix acquiring module 503, interference and noise power of the SB level of a cell in the measurement set of the first UE for the downlink transmission stream to be sent; and a second noise determining subunit, configured to determine, according to the interference and noise power that is of the SB level of the cell in the measurement set of the first UE for the downlink transmission stream to be sent and that is determined by the first noise determining subunit, the interference and noise power of the SB level of the cell outside the measurement set of the first UE for the downlink transmission stream to be sent.

Specifically, the first noise determining subunit is configured to determine, according to the formula (2), the interference and noise power of the SB level of the cell in the measurement set of the first UE for the downlink transmission stream to be sent.

Specifically, the second noise determining subunit is configured to determine, according to the formula (3), the interference and noise power of the SB level of the cell outside the measurement set of the first UE for the downlink transmission stream to be sent.

Optionally, the second noise determining unit may include:

a third noise determining subunit, configured to determine, according to the uplink channel matrix that is of the SB level of each cell in the measurement set of the first UE and that is acquired by the channel matrix acquiring module 503, interference and noise power of the SB level of the cell outside the measurement set of the first UE for the $s_{fb}$-th assumed downlink transmission stream; and a fourth noise determining subunit, configured to determine, according to the interference and noise power that is of the SB level of the cell outside the measurement set of the first UE for the $s_{fb}$-th assumed downlink transmission stream and that is determined by the third noise determining subunit, interference and noise power of the SB level of the cell outside the measurement set of the first UE for the $s_{tx}$-th downlink transmission stream to be sent.

Optionally, when a downlink CQI corresponding to the $s_{fb}$-th assumed downlink transmission stream is obtained according to a first signal to noise ratio, the third noise determining subunit is configured to:

if a transmission mode assumed by the first UE is transmit diversity, determine, according to the formula (4), interference and noise power of the SB level of the cell outside the measurement set of the first UE for the $s_{fb}$-th assumed downlink transmission stream; or if a transmission mode assumed by the first UE is closed-loop spatial multiplexing, determine, according to the formula (5), interference and noise power of the SB level of the cell outside the measurement set of the first UE for the $s_{fb}$-th assumed downlink transmission stream.

Optionally, when a downlink CQI corresponding to the $s_{fb}$-th assumed downlink transmission stream is obtained according to a second signal to noise ratio, the third noise determining subunit is configured to:

if a transmission mode assumed by the first UE is transmit diversity, determine, according to the formula (6), interference and noise power of the SB level of the cell outside the measurement set of the first UE for the $s_{fb}$-th assumed downlink transmission stream;

if a transmission mode assumed by the first UE is closed-loop spatial multiplexing, and a transmission mode for sending a downlink transmission stream by a cell in the transmission set of the first UE is a transmission mode TM8, determine, according to the formula (7), interference and noise power of the SB level of the cell outside the measurement set of the first UE for the $s_{fb}$-th assumed downlink transmission stream; or if a transmission mode assumed by the first UE is closed-loop spatial multiplexing, and a transmission mode for sending a downlink transmission stream by a cell in the transmission set of the first UE is a transmission mode TM9, determine, according to the formula (8), interference and noise power of the SB level of the cell outside the measurement set of the first UE for the $s_{fb}$-th assumed downlink transmission stream.

Optionally, the fourth noise determining subunit is configured to determine, according to the formula (9), the interference and noise power of the SB level of the cell outside the measurement set of the first UE for the $s_{tx}$-th downlink transmission stream to be sent.

Optionally, when a stream quantity $S_{tx}$ of the downlink transmission streams to be sent is equal to a stream quantity $S_{fb}$ of the assumed downlink transmission streams, that is, $S_{tx}=S_{fb}$, the fourth noise determining subunit is configured to determine, according to the formula (10), the interference and noise power of the SB level of the cell outside the measurement set of the first UE for the $s_{tx}$-th downlink transmission stream to be sent.

Optionally, the second noise determining unit may include:

a determining unit, configured to determine whether to calculate the interference and noise power of the SB level of the cell outside the measurement set of the first UE for the $s_{tx}$-th downlink transmission stream to be sent;

a fifth noise determining unit, configured to: when the determining unit determines not to calculate the interference and noise power of the SB level of the cell outside the measurement set of the first UE for the $s_{tx}$-th downlink transmission stream to be sent, set the interference and noise power of the SB level of the cell outside the measurement set of the first UE to 0 for the $s_{tx}$-th downlink transmission stream to be sent; and a sixth noise determining unit, configured to: when the determining unit determines to calculate the interference and noise power of the SB level of the cell outside the measurement set of the first UE for the $s_{tx}$-th downlink transmission stream to be sent, determine, according to a CQI corresponding to the $s_{fb}$-th assumed downlink transmission stream, interference and noise power of the SB level of the cell outside the measurement set of the first UE for the $s_{fb}$-th assumed downlink transmission stream, and determine, according to the interference and noise power of the SB level of the cell outside the measurement set of the first UE for the $s_{fb}$-th assumed downlink transmission stream, the interference and noise power of the SB level of the cell outside the measurement set of the first UE for the $s_{tx}$-th downlink transmission stream to be sent.

Optionally, the determining unit is configured to: compare a threshold with a quantity of code required for calculating the interference and noise power of the SB level of the cell outside the measurement set of the first UE for the $s_{tx}$-th downlink transmission stream to be sent; and if the quantity of code is greater than the threshold, not calculate the interference and noise power of the SB level of the cell outside the measurement set of the first UE for the $s_{tx}$-th downlink transmission stream to be sent; or if the quantity of code is less than the threshold, calculate the interference and noise power of the SB level of the cell outside the measurement set of the first UE for the $s_{tx}$-th downlink transmission stream to be sent.

Optionally, the determining unit is configured to: compare M with $M_{Thr}$, and (M−T) with $I_{Thr}$ separately; and if $M>M_{Thr}$ and $(M-T)>I_{Thr}$, not calculate the interference and noise power of the SB level of the cell outside the measurement set of the first UE for the $s_{tx}$-th downlink transmission stream to be sent; or otherwise, calculate the interference and noise power of the SB level of the cell outside the measurement set of the first UE for the $s_{tx}$-th downlink transmission stream to be sent; where $M_{Thr}$ and $I_{Thr}$ are set thresholds, and generally, $M_{Thr}=3$ and $I_{Thr}=2$.

Optionally, the first SINR determining unit is configured to determine, according to an MRC equalization algorithm, the SINR of the SB level of the $s_{tx}$-th downlink transmission stream to be sent by each cell in the measurement set of the first UE.

Optionally, the first SINR determining unit is configured to determine, according to an IRC equalization algorithm, the SINR of the SB level of the $s_{tx}$-th downlink transmission stream to be sent by each cell in the measurement set of the first UE.

Optionally, the second SINR determining unit is configured to combine, according to an averaging method, the SINRs of the SB levels of the $s_{tx}$-th downlink transmission streams to be sent by the cells in the measurement set of the first UE.

Optionally, the second SINR determining unit is configured to combine, according to an EESM combining method, the SINRs of the SB levels of the $s_{tx}$-th downlink transmission streams to be sent by the cells in the measurement set of the first UE.

Specifically, the second MCS determining module 505 is configured to select an MCS corresponding to a maximum $SINR_{MCS}$ that satisfies $SINR^{s_{tx}} \geq SINR_{MCS}$, as the second downlink MCS of the first UE, where $SINR^{s_{tx}}$ is an SINR of the $s_{tx}$-th downlink transmission stream to be sent by each cell in the measurement set of the first UE, and $SINR_{MCS}$ is the SINR corresponding to the MCS.

In still another implementation manner of this embodiment, the apparatus further includes a measurement set determining module, configured to use a cell adjacent to the first cell or a cell satisfying the formula (1) as the cell in the measurement set of the first UE.

In still another implementation manner of the present invention, the apparatus may further include a TBS determining module 506, configured to determine, according to the second downlink MCS of the first UE that is determined by the second MCS determining module 505 and the transmission resource of the first cell, a TBS sent to the first UE on the transmission resource of the first cell that is allocated to the first UE.

In still another implementation manner of the present invention, the apparatus further includes a sending module, configured to send control signaling to the first UE, where the control signaling includes the second downlink MCS and transmission resource allocation information of the first UE, where the transmission resource allocation information is used to indicate the transmission resource of the first cell that is allocated to the first UE.

In this embodiment of the present invention, an uplink channel matrix of an SB level of each cell in a measurement set of first UE is acquired; and an SINR of a downlink transmission stream to be sent by each cell in a transmission set of the first UE is determined according to the uplink channel matrix of the SB level of each cell in the measurement set of the first UE; and then a second downlink MCS of the first UE is determined according to the SINR of the downlink transmission stream to be sent. That is, in this embodiment of the present invention, a downlink channel is estimated by using an uplink channel. In this manner, in a system (for example, an LTE-TDD system) in which an uplink channel and a downlink channel are approximate, a second downlink MCS that is more accurate than a first downlink MCS may be obtained. As a result, and downlink channel quality can be fully used, and transmission efficiency is improved. In addition, in this embodiment of the present invention, the SINR of the downlink transmission stream to be sent by each cell in the transmission set of the first UE is determined according to the uplink channel matrix of the SB level of each cell in the measurement set of the first UE, and the second downlink MCS of the first UE is determined according to the SINR of the downlink transmission stream to be sent, which avoids a problem that a downlink MCS determined by using a quantized value (CQI) is inaccurate in the prior art, so that the obtained second downlink MCS is more accurate than the first downlink MCS. Further, in this embodiment of the present invention, according to the second downlink MCS of the first UE and a transmission resource of the first cell that is allocated to the first UE, a TBS sent to the first UE on the transmission resource is determined. Because the second downlink MCS is more accurate than the first downlink MCS, accuracy of calculating the TBS can be improved, and transmission efficiency is further improved.

It may be understood that, for an implementation manner and interaction manner of each module and unit in the data transmission apparatus in the foregoing embodiment, reference may be made to the related description in a corresponding method embodiment.

Figure 6:
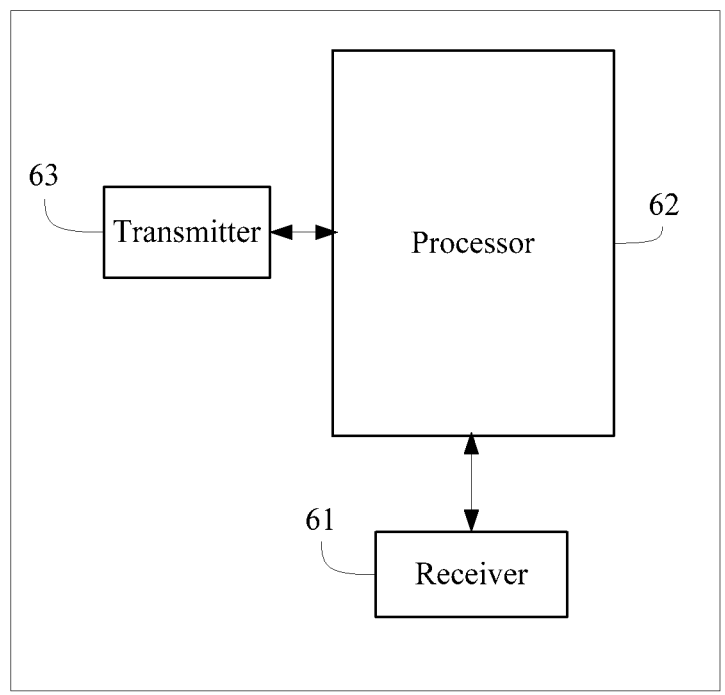
FIG. 6 is a schematic structural diagram of a specific implementation manner of a data transmission apparatus according to an embodiment of the present invention.

An embodiment of the present invention provides a data transmission apparatus, where the apparatus may be an eNB, as shown in FIG. 6. The apparatus includes components such as a receiver 61 and a processor 62. It may be understood by a person skilled in the art that, a structure shown in FIG. 6 does not constitute a limitation on the apparatus. The apparatus may include more or less components than that shown in the figure, or include a combination of some components, or have different component arrangements.

The following introduces each component of an apparatus 60 in detail with reference to FIG. 6.

The receiver 61 may be configured to receive a downlink CQI fed back by UE belonging to a first base station, where the first base station is a base station to which each cell in a measurement set of the first UE belongs.

The processor 62 may be configured to: determine a first downlink MCS of the first UE according to the downlink CQI fed back by the first UE and received by the receiver 61; allocate a transmission resource of a first cell to the first UE according to the determined first downlink MCS of the first UE, where the first cell is a serving cell of the first UE; acquire an uplink channel matrix of an SB level of each cell in the measurement set of the first UE, where the uplink channel matrix of the SB level of each cell in the measurement set of the first UE may be determined according to an SRS sent by the first UE to the first base station; determine, according to the uplink channel matrix of the SB level of each cell in the measurement set of the first UE, an SINR of a downlink transmission stream to be sent by each cell in a transmission set of the first UE; and determine a second downlink MCS of the first UE according to the SINR of the downlink transmission stream to be sent.

Specifically, the processor 62 may be configured to determine the first downlink MCS according to a correspondence between the CQI and the downlink MCS by using the downlink CQI.

Optionally, the processor 62 may be configured to allocate the transmission resource to the first UE according to a PF algorithm or according to an RR algorithm.

Specifically, the processor 62 may be configured to: determine initial priorities of UEs on an SB according to the first downlink MCSs and historical transmission rates of the UEs; and sequentially allocate the SB to the UEs in descending order of initial priorities.

Specifically, the processor 62 may be configured to: determine a priority queue of UEs on an SB according to the first downlink MCSs and historical transmission rates of the UEs; allocate the SB to the first UE according to resource requests sent by the UEs and the priority queue; and adjust a priority of the first UE.

More specifically, the processor 62 may be configured to: determine, according to the uplink channel matrix of the SB level of each cell in the measurement set of the first UE, an SINR of the SB level of the downlink transmission stream to be sent by each cell in the transmission set of the first UE; and combine the SINRs of the SB levels of the downlink transmission streams to be sent by the cells in the transmission set of the first UE, and obtain the SINR of the downlink transmission stream to be sent by each cell in the transmission set of the first UE.

In a first implementation manner of this embodiment, the processor 62 may be configured to: before determining, according to the uplink channel matrix of the SB level of each cell in the measurement set of the first UE, the SINR of the SB level of the downlink transmission stream to be sent by each cell in the transmission set of the first UE, set interference and noise power of the SB level of a cell outside the measurement set of the first UE to 0 for the downlink transmission stream to be sent.

In a second implementation manner of this embodiment, the processor 62 may be configured to: before determining, according to the uplink channel matrix of the SB level of each cell in the measurement set of the first UE, the SINR of the SB level of the downlink transmission stream to be sent by each cell in the transmission set of the first UE, determine, according to the uplink channel matrix of the SB level of each cell in the measurement set of the first UE, interference and noise power of the SB level of a cell outside the measurement set of the first UE for the downlink transmission stream to be sent.

In a third implementation manner of this embodiment, the processor 62 may be configured to: determine, according to the uplink channel matrix of the SB level of each cell in the measurement set of the first UE, interference and noise power of the SB level of a cell in the measurement set of the first UE for the downlink transmission stream to be sent; and determine, according to the interference and noise power of the SB level of the cell in the measurement set of the first UE for the downlink transmission stream to be sent, interference and noise power of the SB level of a cell outside the measurement set of the first UE for the downlink transmission stream to be sent.

Optionally, the processor 62 may be configured to determine, according to the formula (2), the interference and noise power of the SB level of the cell in the measurement set of the first UE for the downlink transmission stream to be sent.

Optionally, the processor 62 may be configured to determine, according to the formula (3), the interference and noise power of the SB level of the cell outside the measurement set of the first UE for the downlink transmission stream to be sent.

In a fourth implementation manner of this embodiment, the processor 62 may be configured to: determine, according to the uplink channel matrix of the SB level of each cell in the measurement set of the first UE, interference and noise power of the SB level of a cell outside the measurement set of the first UE for the $s_{fb}$-th assumed downlink transmission stream; and determine, according to the interference and noise power of the SB level of the cell outside the measurement set of the first UE for the $s_{fb}$-th assumed downlink transmission stream, interference and noise power of the SB level of the cell outside the measurement set of the first UE for the $s_{tx}$-th downlink transmission stream to be sent.

Optionally, the processor 62 may be configured to: when a downlink CQI corresponding to the $s_{fb}$-th assumed downlink transmission stream is obtained according to a first signal to noise ratio, if a transmission mode assumed by the first UE is transmit diversity, determine, according to the formula (4), interference and noise power of the SB level of the cell outside the measurement set of the first UE for the $s_{fb}$-th assumed downlink transmission stream; or if a transmission mode assumed by the first UE is closed-loop spatial multiplexing, determine, according to the formula (5), interference and noise power of the SB level of the cell outside the measurement set of the first UE for the $s_{fb}$-th assumed downlink transmission stream.

Optionally, the processor 62 may be configured to: when a downlink CQI corresponding to the $s_{fb}$-th assumed downlink transmission stream is obtained according to a second signal to noise ratio, if a transmission mode assumed by the first UE is transmit diversity, determine, according to the formula (6), interference and noise power of the SB level of the cell outside the measurement set of the first UE for the $s_{fb}$-th assumed downlink transmission stream;

if a transmission mode assumed by the first UE is closed-loop spatial multiplexing, and a transmission mode for sending a downlink transmission stream by a cell in the transmission set of the first UE is a transmission mode TM8, determine, according to the formula (7), interference and noise power of the SB level of the cell outside the measurement set of the first UE for the $s_{fb}$-th assumed downlink transmission stream; or if a transmission mode assumed by the first UE is closed-loop spatial multiplexing, and a transmission mode for sending a downlink transmission stream by a cell in the transmission set of the first UE is a transmission mode TM9, determine, according to the formula (8), interference and noise power of the SB level of the cell outside the measurement set of the first UE for the $s_{fb}$-th assumed downlink transmission stream.

Optionally, the processor 62 may be configured to determine, according to the formula (9), the interference and noise power of the SB level of the cell outside the measurement set of the first UE for the $s_{tx}$-th downlink transmission stream to be sent.

Optionally, the processor 62 may be configured to: when a stream quantity $S_{tx}$ of the downlink transmission streams to be sent is equal to a stream quantity $S_{fb}$ of the assumed downlink transmission streams, that is, $S_{tx}=S_{fb}$, determine, according to the formula (10), the interference and noise power of the SB level of the cell outside the measurement set of the first UE for the $s_{tx}$-th downlink transmission stream to be sent.

In a fifth implementation manner of this embodiment, the processor 62 may be configured to: determine whether to determine the interference and noise power of the SB level of the cell outside the measurement set of the first UE for the $s_{tx}$-th downlink transmission stream to be sent; when not determining the interference and noise power of the SB level of the cell outside the measurement set of the first UE for the $s_{tx}$-th downlink transmission stream to be sent, set the interference and noise power of the SB level of the cell outside the measurement set of the first UE to 0 for the $s_{tx}$-th downlink transmission stream to be sent; and when determining the interference and noise power of the SB level of the cell outside the measurement set of the first UE for the $s_{tx}$-th downlink transmission stream to be sent, determine, according to a CQI corresponding to the $s_{fb}$-th assumed downlink transmission stream, interference and noise power of the SB level of the cell outside the measurement set of the first UE for the $s_{fb}$-th assumed downlink transmission stream, and determine, according to the interference and noise power of the SB level of the cell outside the measurement set of the first UE for the $s_{fb}$-th assumed downlink transmission stream, the interference and noise power of the SB level of the cell outside the measurement set of the first UE for the $s_{tx}$-th downlink transmission stream to be sent.

Optionally, the processor 62 may be configured to: compare a threshold with a quantity of code required for determining the interference and noise power of the SB level of the cell outside the measurement set of the first UE for the $s_{tx}$-th downlink transmission stream to be sent; and if the quantity of code is greater than the threshold, not determine the interference and noise power of the SB level of the cell outside the measurement set of the first UE for the $s_{tx}$-th downlink transmission stream to be sent; or if the quantity of code is less than the threshold, determine the interference and noise power of the SB level of the cell outside the measurement set of the first UE for the $s_{tx}$-th downlink transmission stream to be sent.

Optionally, the processor 62 is configured to: compare M with $M_{Thr}$, and (M–T) with $I_{Thr}$ separately; and if $M>M_{Thr}$ and $(M-T)>I_{Thr}$, not determine the interference and noise power of the SB level of the cell outside the measurement set of the first UE for the $s_{tx}$-th downlink transmission stream to be sent; or otherwise, determine the interference and noise power of the SB level of the cell outside the measurement set of the first UE for the $s_{tx}$-th downlink transmission stream to be sent; where $M_{Thr}$ and $I_{Thr}$ are set thresholds, and generally, $M_{Thr}=3$ and $I_{Thr}=2$.

In an implementation manner of this embodiment, the processor 62 may be configured to determine, according to an MRC equalization algorithm, the SINR of the SB level of the $s_{tx}$-th downlink transmission stream to be sent by each cell in the measurement set of the first UE.

In another implementation manner of this embodiment, the processor 62 may be configured to determine, according to an IRC equalization algorithm, the SINR of the SB level of the $s_{tx}$-th downlink transmission stream to be sent by each cell in the measurement set of the first UE.

In an implementation manner of this embodiment, the processor 62 may be configured to combine, according to an averaging method, the SINRs of the SB levels of the $s_{tx}$-th downlink transmission streams to be sent by the cells in the measurement set of the first UE.

In another implementation manner of this embodiment, the processor 62 may be configured to combine, according to an EESM combining method, the SINRs of the SB levels of the $s_{tx}$-th downlink transmission streams to be sent by the cells in the measurement set of the first UE.

Specifically, the processor 62 may be configured to select an MCS corresponding to a maximum $SINR_{MCS}$ that satisfies $SINR^{s_{tx}} \geq SINR_{MCS}$, as the second downlink MCS of the first UE, where $SINR^{s_{tx}}$ is an SINR of the $s_{tx}$-th downlink transmission stream to be sent by each cell in the measurement set of the first UE, and $SINR_{MCS}$ is the SINR corresponding to the MCS.

In still another implementation manner of this embodiment, the processor 62 may be configured to use a cell adjacent to the first cell or a cell satisfying the formula (1) as the cell in the measurement set of the first UE.

In still another implementation manner of this embodiment, the processor 62 may be further configured to determine, according to the second downlink MCS of the first UE and the transmission resource of the first cell, a TBS sent to the first UE on the transmission resource of the first cell that is allocated to the first UE.

In still another implementation manner of this embodiment, the apparatus may further include a transmitter 63. The transmitter 63 may be configured to send control signaling to the first UE, where the control signaling includes the second downlink MCS and transmission resource allocation information of the first UE, where the transmission resource allocation information is used to indicate the transmission resource of the first cell that is allocated to the first UE.

In this embodiment of the present invention, an uplink channel matrix of an SB level of each cell in a measurement set of first UE is acquired; and an SINR of a downlink transmission stream to be sent by each cell in a transmission set of the first UE is determined according to the uplink channel matrix of the SB level of each cell in the measurement set of the first UE; and then a second downlink MCS of the first UE is determined according to the SINR of the downlink transmission stream to be sent. That is, in this embodiment of the present invention, a downlink channel is estimated by using an uplink channel. In this manner, in a system (for example, an LTE-TDD system) in which an uplink channel and a downlink channel are approximate, a second downlink MCS that is more accurate than a first downlink MCS may be obtained. As a result, downlink channel quality can be fully used, and transmission efficiency is improved. In addition, in this embodiment of the present invention, the SINR of the downlink transmission stream to be sent by each cell in the transmission set of the first UE is determined according to the uplink channel matrix of the SB level of each cell in the measurement set of the first UE, and the second downlink MCS of the first UE is determined according to the SINR of the downlink transmission stream to be sent, which avoids a problem that a downlink MCS determined by using a quantized value (CQI) is inaccurate in the prior art, so that the obtained second downlink MCS is more accurate than the first downlink MCS. Further, in this embodiment of the present invention, according to the second downlink MCS of the first UE and a transmission resource of the first cell that is allocated to the first UE, a TBS sent to the first UE on the transmission resource is determined. Because the second downlink MCS is more accurate than the first downlink MCS, accuracy of calculating the TBS can be improved, and transmission efficiency is further improved.

It may be understood that, for an implementation manner and interaction manner of each component in the data transmission apparatus in the foregoing embodiment, reference may be made to the related description in a corresponding method embodiment.

Figure 7:
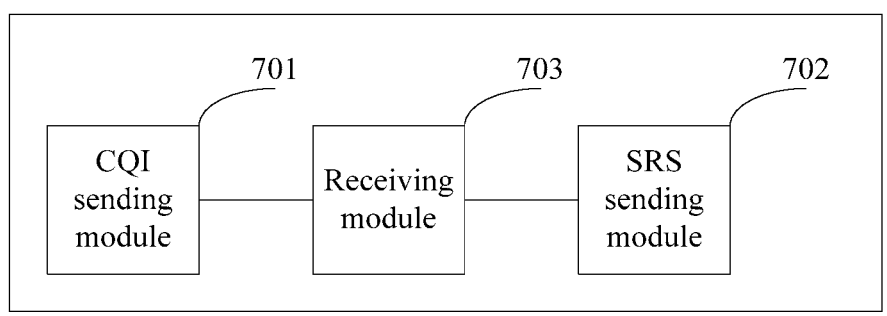
FIG. 7 is a schematic structural diagram of UE according to an embodiment of the present invention.

An embodiment of the present invention provides UE. Referring to FIG. 7, the UE includes:

a CQI sending module 701, configured to send a downlink CQI to a base station to which a first cell belongs, where the first cell is a serving cell of the UE;

an SRS sending module 702, configured to send an SRS to a first base station, where the first base station is a base station to which each cell in a measurement set of the UE belongs; and a receiving module 703, configured to receive transmission resource allocation information and a second downlink MCS that are sent by the base station, where the transmission resource allocation information is used to indicate a transmission resource of the first cell that is allocated by the base station to the UE, where the transmission resource is allocated, after the base station determines a first downlink MCS according to the downlink CQI sent by the UE, to the UE according to the first downlink MCS, and the second downlink MCS is determined by the base station in the following manner: acquiring an uplink channel matrix of an SB level of each cell in the measurement set of the UE; determining, according to the uplink channel matrix of the SB level of each cell in the measurement set of the UE, an SINR of a downlink transmission stream to be sent by each cell in a transmission set of the UE; and determining the second downlink MCS of the UE according to the SINR of the downlink transmission stream to be sent; where the uplink channel matrix of the SB level of each cell in the measurement set of the UE is determined according to the SRS sent by the UE to the first base station, and the transmission set is a subset of the measurement set.

In an implementation manner of this embodiment, the receiving module 703 may be configured to receive control signaling sent by the base station, where the control signaling includes the transmission resource allocation information and the second downlink MCS.

In another implementation manner of this embodiment, the UE may further include a TBS determining module, configured to determine, according to the transmission resource allocation information and the second downlink MCS that are received, a TBS sent by the base station to the UE on the transmission resource of the first cell that is allocated to the UE.

In this embodiment of the present invention, an uplink channel matrix of an SB level of each cell in a measurement set of UE is acquired; and an SINR of a downlink transmission stream to be sent by each cell in a transmission set of the UE is determined according to the uplink channel matrix of the SB level of each cell in the measurement set of the UE; and then a second downlink MCS of the UE is determined according to the SINR of the downlink transmission stream to be sent. That is, in this embodiment of the present invention, a downlink channel is estimated by using an uplink channel. In this manner, in a system (for example, an LTE-TDD system) in which an uplink channel and a downlink channel are approximate, a second downlink MCS that is more accurate than a first downlink MCS may be obtained. As a result, downlink channel quality can be fully used, and transmission efficiency is improved. In addition, in this embodiment of the present invention, the SINR of the downlink transmission stream to be sent by each cell in the transmission set of the UE is determined according to the uplink channel matrix of the SB level of each cell in the measurement set of the UE, and the second downlink MCS of the UE is determined according to the SINR of the downlink transmission stream to be sent, which avoids a problem that a downlink MCS determined by using a quantized value (CQI) is inaccurate in the prior art, so that the obtained second downlink MCS is more accurate than the first downlink MCS. Further, in this embodiment of the present invention, according to the second downlink MCS of the UE and a transmission resource of the first cell that is allocated to the UE, a TBS sent to the UE on the transmission resource is determined. Because the second downlink MCS is more accurate than the first downlink MCS, accuracy of calculating the TBS can be improved, and transmission efficiency is further improved.

It may be understood that, for an implementation manner and interaction manner of each component in the data transmission apparatus in the foregoing embodiment, reference may be made to the related description in a corresponding method embodiment.

Figure 8:
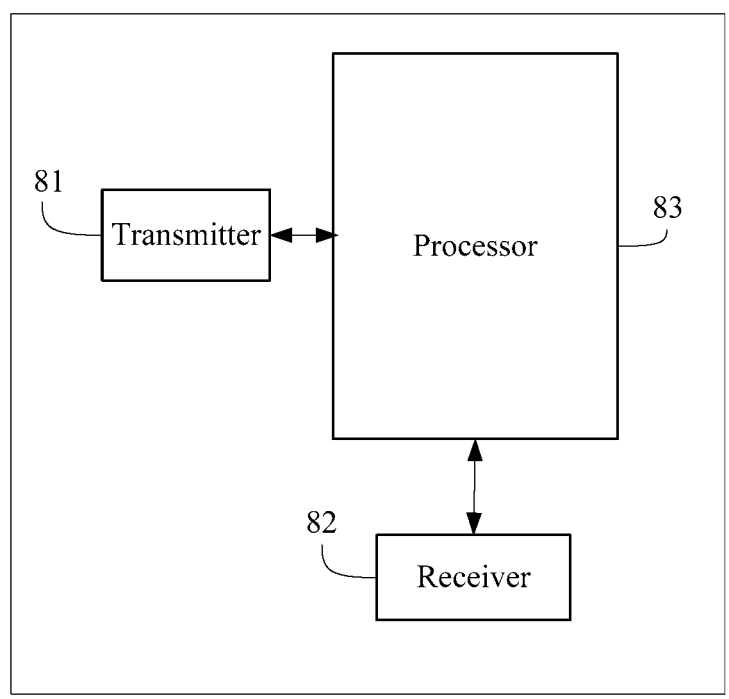
FIG. 8 is a schematic structural diagram of a specific implementation manner of UE according to an embodiment of the present invention.

An embodiment of the present invention provides UE, as shown in FIG. 8. The UE includes components such as a transmitter 81, a receiver 82, and a processor 83. It may be understood by a person skilled in the art that, a structure shown in FIG. 8 does not constitute a limitation on the UE. The UE may include more or less components than that shown in the figure, or include a combination of some components, or have different component arrangements.

The following introduces each component of UE 80 in detail with reference to FIG. 8.

The transmitter 81 may be configured to send a downlink CQI to a base station to which a first cell belongs, where the first cell is a serving cell of the UE.

The transmitter 81 may be further configured to send an SRS to a first base station, where the first base station is a base station to which each cell in a measurement set of the UE belongs.

The receiver 82 may be configured to receive transmission resource allocation information and a second downlink MCS that are sent by the base station.

In this embodiment, the transmission resource allocation information is used to indicate a transmission resource of the first cell that is allocated by the base station to the UE, where the transmission resource is allocated, after the base station determines a first downlink MCS according to the downlink CQI sent by the UE, to the UE according to the first downlink MCS, and the second downlink MCS is determined by the base station in the following manner: acquiring an uplink channel matrix of an SB level of each cell in the measurement set of the UE; determining, according to the uplink channel matrix of the SB level of each cell in the measurement set of the UE, an SINR of a downlink transmission stream to be sent by each cell in a transmission set of the UE; and determining the second downlink MCS of the UE according to the SINR of the downlink transmission stream to be sent; where the uplink channel matrix of the SB level of each cell in the measurement set of the UE is determined according to the SRS sent by the UE to the first base station, and the transmission set is a subset of the measurement set.

In an implementation manner of this embodiment, the receiver 82 may be configured to receive control signaling sent by the base station, where the control signaling includes the transmission resource allocation information and the second downlink MCS.

In another implementation manner of this embodiment, the processor 83 may be configured to determine, according to the transmission resource allocation information and the second downlink MCS that are received, a TBS sent by the base station to the UE on the transmission resource of the first cell that is allocated to the UE.

In this embodiment of the present invention, an uplink channel matrix of an SB level of each cell in a measurement set of UE is acquired; and an SINR of a downlink transmission stream to be sent by each cell in a transmission set of the UE is determined according to the uplink channel matrix of the SB level of each cell in the measurement set of the UE; and then a second downlink MCS of the UE is determined according to the SINR of the downlink transmission stream to be sent. That is, in this embodiment of the present invention, a downlink channel is estimated by using an uplink channel. In this manner, in a system (for example, an LTE-TDD system) in which an uplink channel and a downlink channel are approximate, a second downlink MCS that is more accurate than a first downlink MCS may be obtained. As a result, downlink channel quality can be fully used, and transmission efficiency is improved. In addition, in this embodiment of the present invention, the SINR of the downlink transmission stream to be sent by each cell in the transmission set of the UE is determined according to the uplink channel matrix of the SB level of each cell in the measurement set of the UE, and the second downlink MCS of the UE is determined according to the SINR of the downlink transmission stream to be sent, which avoids a problem that a downlink MCS determined by using a quantized value (CQI) is inaccurate in the prior art, so that the obtained second downlink MCS is more accurate than the first downlink MCS. Further, in this embodiment of the present invention, according to the second downlink MCS of the UE and a transmission resource of the first cell that is allocated to the UE, a TBS sent to the UE on the transmission resource is determined. Because the second downlink MCS is more accurate than the first downlink MCS, accuracy of calculating the TBS can be improved, and transmission efficiency is further improved.

It may be understood that, for an implementation manner and interaction manner of each component in the data transmission apparatus in the foregoing embodiment, reference may be made to the related description in a corresponding method embodiment.

It should be noted that, division of the foregoing functional modules is used as only an example for description when the data transmission apparatus and user equipment that are provided in the foregoing embodiments perform data transmission. In an actual application, the foregoing functions may be allocated to different functional modules for implementation according to a requirement, that is, internal structures of the apparatus and user equipment are divided into different functional modules to implement all or some of the functions described above. In addition, the data transmission apparatus (or user equipment) provided in the foregoing embodiments belongs to a same conception as the data transmission method embodiment. For a specific implementation process of the data transmission apparatus, reference may be made to the method embodiment, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

Finally, it should be noted that, the foregoing embodiments are merely intended for describing the technical solutions of the present invention, but not for limiting the present invention. Although the present invention is described in detail with reference to the foregoing embodiments, a person of ordinary skill in the art should understand that modifications to the technical solutions described in the foregoing embodiments or equivalent replacements to some technical features thereof may still be made without departing from the spirit and scope of the technical solutions of the embodiments of the present invention.

What is claimed is:
1. A data transmission method, wherein the method comprises:

receiving a downlink channel quality indicator fed back by first user equipment, and determining a first downlink modulation and coding scheme of the first user equipment according to the downlink channel quality indicator fed back by the first user equipment;

allocating a transmission resource of a first cell to the first user equipment according to the first downlink modulation and coding scheme of the first user equipment, wherein the first cell is a serving cell of the first user equipment;

acquiring an uplink channel matrix of a sub-bandwidth level of each cell in a measurement set of the first user equipment, wherein the uplink channel matrix of the sub-bandwidth level of each cell in the measurement set of the first user equipment is determined according to a sounding reference signal sent by the first user equipment to a first base station, and the first base station is a base station to which each cell in the measurement set of the first user equipment belongs;

determining, according to the uplink channel matrix of the sub-bandwidth level of each cell in the measurement set of the first user equipment, a signal to interference plus noise ratio of a downlink transmission stream to be sent by each cell in a transmission set of the first user equipment, wherein the transmission set of the first user equipment is a subset of the measurement set of the first user equipment; and determining a second downlink modulation and coding scheme of the first user equipment according to the signal to interference plus noise ratio of the downlink transmission stream to be sent;

wherein the cell in the measurement set of the first user equipment is a cell adjacent to the first cell or is a cell satisfying the following formula:

$|RSRP_1 - RSRP_i| < Thr;$ wherein, $RSRP_1$ is reference signal received power of the first cell, $RSRP_i$ is reference signal received power of another cell than the first cell, and Thr is a set threshold.

2. The method according to claim 1, wherein the determining, according to the uplink channel matrix of the sub-bandwidth level of each cell in the measurement set of the first user equipment, a signal to interference plus noise ratio of a downlink transmission stream to be sent by each cell in a transmission set of the first user equipment comprises:

determining, according to the uplink channel matrix of the sub-bandwidth level of each cell in the measurement set of the first user equipment, a signal to interference plus noise ratio of the sub-bandwidth level of the downlink transmission stream to be sent by each cell in the transmission set of the first user equipment; and combining the signal to interference plus noise ratios of the sub-bandwidth levels of the downlink transmission streams to be sent by the cells in the transmission set of the first user equipment, and obtaining the signal to interference plus noise ratio of the downlink transmission stream to be sent by each cell in the transmission set of the first user equipment.

3. The method according to claim 1, wherein the determining a second downlink modulation and coding scheme of the first user equipment according to the signal to interference plus noise ratio of the downlink transmission stream to be sent comprises:

selecting a modulation and coding scheme corresponding to a maximum $SINR_{MCS}$ that satisfies $SINR^{S_{Tx}} \geq SINR_{MCS}$, as the second downlink modulation and coding scheme of the first user equipment;

wherein, $SINR^{S_{Tx}}$ is a signal to interference plus noise ratio of the six-th downlink transmission stream to be sent by each cell in the measurement set of the first user equipment, six is the stream number of the downlink transmission stream to be sent, and $SINR_{MCS}$ is the signal to interference plus noise ratio corresponding to the modulation and coding scheme.

4. The method according to claim 1, wherein the method further comprises:

determining, according to the second downlink modulation and coding scheme of the first user equipment and the transmission resource of the first cell, a transport block size sent to the first user equipment on the transmission resource of the first cell that is allocated to the first user equipment.

5. The method according to claim 1, wherein the method further comprises:

sending control signaling to the first user equipment, wherein the control signaling comprises the second downlink modulation and coding scheme and transmission resource allocation information of the first user equipment, wherein the transmission resource allocation information is used to indicate the transmission resource of the first cell that is allocated to the first user equipment.

6. A data transmission apparatus, wherein the apparatus comprises:

a receiver configured to receive a downlink channel quality indicator fed back by first user equipment; and a processor configured to determine a first downlink modulation and coding scheme of the first user equipment according to the downlink channel quality indicator fed back by the first user equipment, to allocate a transmission resource of the first cell to the first user equipment according to the first downlink modulation and coding scheme of the first user equipment, to acquire an uplink channel matrix of a sub-bandwidth level of each cell in a measurement set of the first user equipment, to determine, according to the uplink channel matrix that is of the sub-bandwidth level of each cell in the measurement set of the first user equipment, a signal to interference plus noise ratio of a downlink transmission stream to be sent by each cell in a transmission set of the first user equipment, and to determine a second downlink modulation and coding scheme of the first user equipment according to the signal to interference plus noise ratio that is of the downlink transmission stream to be sent;

wherein the first cell is a serving cell of the first user equipment, the uplink channel matrix of the sub-bandwidth level of each cell in the measurement set of the first user equipment is determined according to a sounding reference signal sent by the first user equipment to a first base station, and the first base station is a base station to which each cell in the measurement set of the first user equipment belongs, the transmission set of the first user equipment is a subset of the measurement set of the first user equipment;

wherein the cell in the measurement set of the first user equipment is a cell adjacent to the first cell or is a cell satisfying the following formula:

$|RSRP_1 - RSRP_i| < Thr;$ wherein, $RSRP_1$ is reference signal received power of the first cell, $RSRP_i$ is reference signal received power of another cell than the first cell, and Thr is a set threshold.

7. The apparatus according to claim 6, wherein the processor is further configured to determine, according to the uplink channel matrix that is of the sub-bandwidth level of each cell in the measurement set of the first user equipment and a signal to interference plus noise ratio of the sub-bandwidth level of the downlink transmission stream to be sent by each cell in the transmission set of the first user equipment; and combine the signal to interference plus noise ratios that are of the sub-bandwidth levels of the downlink transmission streams to be sent by the cells in the transmission set of the first user equipment, and obtain the signal to interference plus noise ratio of the downlink transmission stream to be sent by each cell in the transmission set of the first user equipment.

8. The apparatus according to claim 7, wherein the processor plus noise ratio is further configured to:
determine, according to a maximum ratio combining equalization algorithm, the signal to interference plus noise ratio of the sub-bandwidth level of the downlink transmission stream to be sent by each cell in the transmission set of the first user equipment.

9. The apparatus according to claim 7, wherein the processor is further configured to:
determine, according to an interference rejection combining equalization algorithm, the signal to interference plus noise ratio of the sub-bandwidth level of the downlink transmission stream to be sent by each cell in the transmission set of the first user equipment.

10. The apparatus according to claim 7, wherein the processor is further configured to:
combine, according to an averaging method, the signal to interference plus noise ratios of the sub-bandwidth levels of the downlink transmission streams to be sent by the cells in the transmission set of the first user equipment.

11. The apparatus according to claim 7, wherein the processor is further configured to:
combine, according to an exponential effective signal to interference plus noise ratio mapping combining method, the signal to interference plus noise ratios of the sub-bandwidth levels of the downlink transmission streams to be sent by the cells in the transmission set of the first user equipment.

12. The apparatus according to claim 6, wherein processor is further configured to:
select a modulation and coding scheme corresponding to a maximum $SINR_{MCS}$ that satisfies $SINR^{S_\alpha} \geq SINR_{MCS}$, as the second downlink modulation and coding scheme of the first user equipment;
wherein, $SINR^{S_\alpha}$ is a signal to interference plus noise ratio of the six-th downlink transmission stream to be sent by each cell in the measurement set of the first user equipment, six is the stream number of the downlink transmission stream to be sent, and $SINR_{MCS}$ is the signal to interference plus noise ratio corresponding to the modulation and coding scheme.

13. The apparatus according to claim 6, wherein the processor is further configured to determine, according to the second downlink modulation and coding scheme of the first user equipment and the transmission resource of the first cell, a transport block size sent to the first user equipment on the transmission resource of the first cell that is allocated to the first user equipment.

14. The apparatus according to claim 6, wherein the apparatus further comprises:
a sender configured to send control signaling to the first user equipment, wherein the control signaling comprises the second downlink modulation and coding scheme and transmission resource allocation information of the first user equipment, wherein the transmission resource allocation information is used to indicate the transmission resource of the first cell that is allocated to the first user equipment.

15. A piece of user equipment, wherein the user equipment comprises:
a sender configured to send a downlink channel quality indicator to a base station to which the first cell belongs, wherein the first cell is a serving cell of the user equipment, and to send a sounding reference signal to a first base station, wherein the first base station is a base station to which each cell in a measurement set of the user equipment belongs; and
a receiver configured to receive transmission resource allocation information and a second downlink modulation and coding scheme that are sent by the base station;
wherein the transmission resource allocation information is used to indicate a transmission resource of the first cell that is allocated by the base station to the user equipment, wherein the transmission resource is allocated, after the base station determines a first downlink modulation and coding scheme according to the downlink channel quality indicator sent by the user equipment, to the user equipment according to the first downlink modulation and coding scheme, and the second downlink modulation and coding scheme is determined according to the signal to interference plus noise ratio of the downlink transmission stream to be sent; wherein the uplink channel matrix of the sub-bandwidth level of each cell in the measurement set of the user equipment is determined according to the sounding reference signal sent by the user equipment to the first base station, the signal to interference plus noise ratio of the downlink transmission stream to be sent is determined according to an uplink channel matrix of the sub-bandwidth level of each cell in the measurement set of the user equipment, and the transmission set of the user equipment is a subset of the measurement set of the user equipment;
wherein the cell in the measurement set of the first user equipment is a cell adjacent to the first cell or is a cell satisfying the following formula:

$|RSRP_1 - RSRP_i| < Thr;$ wherein, $RSRP_1$ is reference signal received power of the first cell, $RSRP_i$ is reference signal received power of another cell than the first cell, and Thr is a set threshold.

16. The user equipment according to claim 15, wherein the receiving module is configured to:
receive control signaling sent by the base station, wherein the control signaling comprises the transmission resource allocation information and the second downlink modulation and coding scheme.

17. The user equipment according to claim 15, wherein the user equipment further comprises:
a transport block size determining circuit configured to determine, according to the transmission resource allocation information and the second downlink modulation and coding scheme that are received, a transport block size sent by the base station to the user equipment on the transmission resource of the first cell that is allocated to the user equipment.

\* \* \* \* \*